United States Patent
Sato et al.

(10) Patent No.: US 7,742,238 B2
(45) Date of Patent: Jun. 22, 2010

(54) IMAGING LENS

(75) Inventors: Kenichi Sato, Saitama (JP); Minoru Taniyama, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 115 days.

(21) Appl. No.: 12/058,291

(22) Filed: Mar. 28, 2008

(65) Prior Publication Data
US 2008/0291551 A1 Nov. 27, 2008

(30) Foreign Application Priority Data
Mar. 30, 2007 (JP) .......................... P2007-093306

(51) Int. Cl.
*G02B 3/02* (2006.01)
(52) U.S. Cl. ...................... 359/716; 359/708
(58) Field of Classification Search ................ 359/708, 359/713–716, 784, 789
See application file for complete search history.

(56) References Cited

U.S. PATENT DOCUMENTS

| 6,961,191 | B2 | 11/2005 | Sato et al. |
| 7,099,092 | B2 | 8/2006 | Sato et al. |
| 7,180,687 | B2 | 2/2007 | Sato et al. |
| 7,184,225 | B1 * | 2/2007 | Noda .......................... 359/784 |
| 2004/0190162 | A1 | 9/2004 | Sato | |

FOREIGN PATENT DOCUMENTS

| JP | 2004-302058 A | 10/2004 |
| JP | 2005-173319 A | 6/2005 |
| JP | 2005-227755 A | 8/2005 |
| JP | 2005-292235 A | 10/2005 |

* cited by examiner

*Primary Examiner*—Joseph Martinez
*Assistant Examiner*—James R Greece
(74) *Attorney, Agent, or Firm*—Birch, Stewart, Kolasch & Birch, LLP

(57) ABSTRACT

An imaging lens includes, in order from an object side, a first lens having a positive refractive power and having a meniscus shape with a convex surface directed to the object side thereof, a second lens having a concave object-side surface and a third lens having a negative refractive power in a vicinity of an optical axis. Each of the second and third lenses has at least one aspheric surface. The following conditional expressions are satisfied:

$$0.8 < f1/f < 1.2 \quad (1)$$

$$11 < |f2/f| \quad (2)$$

$$0.04 < SA/Y < 0.09 \quad (3)$$

$$TL/2Y < 0.9 \quad (4)$$

where
SA denotes the amount of sag of the object-side surface of the second lens in a position where a principal ray passes the maximum image height,
Y denotes the maximum image height, and
TL denotes a distance from an object-side surface of the first lens to an image formation position.

21 Claims, 24 Drawing Sheets

EXAMPLE 1

EXAMPLE 1

EXAMPLE 2

EXAMPLE 3

EXAMPLE 4

EXAMPLE 5

EXAMPLE 6

FIG. 12

| EXAMPLE 1: BASIC LENS DATA ||||||
|---|---|---|---|---|
| Si (SURFACE NUMBER) | Ri (CURVATURE RADIUS) | Di (SURFACE SEPARATION) | Ndj (REFRACTIVE INDEX) | νdj (ABBE NUMBER) |
| 0 (APERTURE STOP) | — | -0.10 | | |
| *1 | 1.072 | 0.67 | 1.510 | 56.2 |
| *2 | 2.271 | 0.80 | | |
| *3 | -1.951 | 0.50 | 1.606 | 27 |
| *4 | -2.013 | 0.14 | | |
| *5 | 3.171 | 0.76 | 1.532 | 55.4 |
| *6 | 1.637 | 0.50 | | |
| 7 | ∞ | 0.30 | 1.516 | 64.1 |
| 8 | ∞ | 0.40 | | |

(*: ASPHERIC SURFACE ) (f=3.76, FNo.=3.5)

FIG. 13

| EXAMPLE 1: ASPHERIC SURFACE DATA ||||
|---|---|---|---|
| ASPHERIC SURFACE COEFFICIENT | SURFACE NUMBER |||
| | 1ST SURFACE | 2ND SURFACE | 3RD SURFACE |
| K | 1.796E+00 | 8.000E+00 | -2.980E+00 |
| A3 | -1.487E-03 | 1.312E-02 | -2.977E-03 |
| A4 | -1.093E-02 | 2.064E-02 | -2.062E-02 |
| A5 | -1.605E-01 | 1.086E-01 | -9.628E-02 |
| A6 | 9.481E-03 | 1.024E-01 | -9.426E-02 |
| A7 | 2.752E-01 | -2.914E-01 | -1.511E-01 |
| A8 | -3.383E-02 | 1.839E-01 | 2.630E-01 |
| A9 | -4.302E-01 | -5.749E-01 | 3.510E-01 |
| A10 | -3.078E-01 | 1.619E+00 | -5.578E-01 |
| | 4TH SURFACE | 5TH SURFACE | 6TH SURFACE |
| K | -8.485E+00 | -8.179E+00 | -4.584E-02 |
| A3 | -1.506E-01 | -2.570E-01 | -1.576E-01 |
| A4 | 2.790E-02 | 7.005E-03 | -1.193E-01 |
| A5 | -2.160E-02 | 5.836E-02 | 9.216E-02 |
| A6 | 3.883E-02 | 1.897E-02 | -1.275E-03 |
| A7 | 1.295E-03 | -1.352E-02 | -1.328E-02 |
| A8 | 1.001E-02 | -3.509E-03 | -3.103E-03 |
| A9 | -2.397E-03 | 2.116E-03 | 3.991E-03 |
| A10 | -2.371E-03 | -2.253E-04 | -8.067E-04 |

FIG. 14

| EXAMPLE 2: BASIC LENS DATA ||||||
|---|---|---|---|---|
| Si (SURFACE NUMBER) | Ri (CURVATURE RADIUS) | Di (SURFACE SEPARATION) | Ndj (REFRACTIVE INDEX) | $\nu dj$ (ABBE NUMBER) |
| 0 (APERTURE STOP) | — | 0.00 | | |
| *1 | 1.073 | 0.69 | 1.510 | 56.2 |
| *2 | 2.278 | 0.79 | | |
| *3 | −1.906 | 0.55 | 1.606 | 27 |
| *4 | −2.168 | 0.15 | | |
| *5 | 2.926 | 0.74 | 1.532 | 55.4 |
| *6 | 1.708 | 0.50 | | |
| 7 | ∞ | 0.30 | 1.516 | 64.1 |
| 8 | ∞ | 0.43 | | |

(*: ASPHERIC SURFACE) (f=3.85, FNo.=3.5)

FIG. 15

| EXAMPLE 2: ASPHERIC SURFACE DATA ||||
|---|---|---|---|
| ASPHERIC SURFACE COEFFICIENT | SURFACE NUMBER |||
| | 1ST SURFACE | 2ND SURFACE | 3RD SURFACE |
| K | 1.621E+00 | 8.179E+00 | −4.794E−01 |
| A3 | −2.107E−03 | 9.336E−03 | 2.381E−03 |
| A4 | −4.658E−03 | 3.607E−02 | 4.643E−04 |
| A5 | −1.001E−01 | 4.185E−02 | −1.029E−01 |
| A6 | −5.429E−02 | 1.303E−01 | −1.076E−01 |
| A7 | 2.547E−01 | −1.340E−01 | −1.224E−01 |
| A8 | 7.583E−02 | 3.363E−01 | 2.348E−01 |
| A9 | −5.380E−01 | −1.610E+00 | 3.494E−01 |
| A10 | 4.608E−03 | 2.410E+00 | −5.694E−01 |
| | 4TH SURFACE | 5TH SURFACE | 6TH SURFACE |
| K | −6.579E+00 | −1.148E+01 | −8.841E−02 |
| A3 | −1.361E−01 | −2.547E−01 | −1.493E−01 |
| A4 | 2.274E−02 | 1.076E−02 | −1.229E−01 |
| A5 | −2.290E−02 | 5.827E−02 | 9.113E−02 |
| A6 | 4.905E−02 | 1.792E−02 | 7.085E−04 |
| A7 | −1.481E−02 | −1.345E−02 | −1.417E−02 |
| A8 | 5.831E−03 | −3.788E−03 | −2.788E−03 |
| A9 | 1.002E−02 | 2.235E−03 | 3.907E−03 |
| A10 | −6.221E−03 | −1.950E−04 | −7.902E−04 |

FIG. 16

| EXAMPLE 3: BASIC LENS DATA |||||
|---|---|---|---|---|
| Si (SURFACE NUMBER) | Ri (CURVATURE RADIUS) | Di (SURFACE SEPARATION) | Ndj (REFRACTIVE INDEX) | νdj (ABBE NUMBER) |
| 0 (APERTURE STOP) | — | −0.05 | | |
| *1 | 1.094 | 0.68 | 1.510 | 56.2 |
| *2 | 2.331 | 0.81 | | |
| *3 | −1.903 | 0.50 | 1.606 | 27 |
| *4 | −2.101 | 0.15 | | |
| *5 | 3.030 | 0.79 | 1.532 | 55.4 |
| *6 | 1.762 | 0.50 | | |
| 7 | ∞ | 0.30 | 1.516 | 64.1 |
| 8 | ∞ | 0.44 | | |

(*: ASPHERIC SURFACE) (f=3.84, FNo.=3.5)

FIG. 17

| EXAMPLE 3: ASPHERIC SURFACE DATA ||||
|---|---|---|---|
| ASPHERIC SURFACE COEFFICIENT | SURFACE NUMBER |||
| | 1ST SURFACE | 2ND SURFACE | 3RD SURFACE |
| K | 1.900E+00 | 9.301E+00 | −8.197E−01 |
| A3 | −4.698E−04 | 7.539E−03 | −1.887E−02 |
| A4 | −2.744E−02 | 2.544E−02 | 7.073E−03 |
| A5 | −1.326E−01 | 6.039E−02 | −7.559E−02 |
| A6 | −1.713E−02 | 5.067E−02 | −1.241E−01 |
| A7 | 2.598E−01 | −1.562E−01 | −1.056E−01 |
| A8 | −2.986E−02 | 4.055E−01 | 2.137E−01 |
| A9 | −5.382E−01 | −1.257E+00 | 3.360E−01 |
| A10 | −1.572E−01 | 1.670E+00 | −5.100E−01 |
| | 4TH SURFACE | 5TH SURFACE | 6TH SURFACE |
| K | −6.220E+00 | −1.552E+01 | 1.172E−01 |
| A3 | −1.651E−01 | −2.534E−01 | −1.321E−01 |
| A4 | 2.530E−02 | 6.560E−03 | −1.314E−01 |
| A5 | −1.998E−02 | 6.021E−02 | 8.808E−02 |
| A6 | 4.584E−02 | 1.814E−02 | 7.038E−04 |
| A7 | 8.770E−04 | −1.298E−02 | −1.373E−02 |
| A8 | 8.889E−03 | −3.826E−03 | −2.595E−03 |
| A9 | 3.778E−03 | 2.262E−03 | 3.855E−03 |
| A10 | −5.878E−03 | −2.651E−04 | −8.104E−04 |

FIG. 18

| | EXAMPLE 4: BASIC LENS DATA | | | |
|---|---|---|---|---|
| Si (SURFACE NUMBER) | Ri (CURVATURE RADIUS) | Di (SURFACE SEPARATION) | Ndj (REFRACTIVE INDEX) | $\nu$dj (ABBE NUMBER) |
| 0 (APERTURE STOP) | — | −0.10 | | |
| *1 | 1.131 | 0.66 | 1.510 | 56.2 |
| *2 | 2.464 | 0.77 | | |
| 3 | −1.670 | 0.50 | 1.606 | 56 |
| *4 | −1.784 | 0.14 | | |
| *5 | 2.856 | 0.95 | 1.532 | 55.4 |
| *6 | 1.704 | 0.50 | | |
| 7 | ∞ | 0.30 | 1.516 | 64.1 |
| 8 | ∞ | 0.42 | | |

(*: ASPHERIC SURFACE) (f=3.73, FNo.=3.5)

FIG. 19

| | EXAMPLE 4: ASPHERIC SURFACE DATA | | |
|---|---|---|---|
| ASPHERIC SURFACE COEFFICIENT | SURFACE NUMBER | | |
| | 1ST SURFACE | 2ND SURFACE | 4TH SURFACE |
| K | 1.367E+00 | 8.000E+00 | −4.421E+00 |
| A3 | −8.638E−03 | 5.391E−03 | −1.759E−01 |
| A4 | 5.948E−02 | 4.357E−02 | 3.499E−02 |
| A5 | −1.075E−01 | 1.134E−01 | −7.641E−03 |
| A6 | −7.260E−02 | 5.701E−02 | 5.679E−02 |
| A7 | 2.710E−01 | −2.585E−01 | 1.553E−02 |
| A8 | −2.243E−02 | 4.893E−01 | 1.967E−02 |
| A9 | 1.924E−01 | −1.252E+00 | −1.136E−03 |
| A10 | −5.205E−01 | 1.851E+00 | −1.410E−02 |
| | 5TH SURFACE | 6TH SURFACE | |
| K | −2.075E+00 | −2.657E−01 | |
| A3 | −2.560E−01 | −1.057E−01 | |
| A4 | 1.047E−02 | −1.297E−01 | |
| A5 | 6.078E−02 | 9.060E−02 | |
| A6 | 1.740E−02 | −5.404E−04 | |
| A7 | −1.584E−02 | −1.274E−02 | |
| A8 | −4.482E−03 | −2.985E−03 | |
| A9 | 2.119E−03 | 4.092E−03 | |
| A10 | 2.526E−04 | −8.508E−04 | |

FIG. 20

| EXAMPLE 5: BASIC LENS DATA | | | | |
|---|---|---|---|---|
| Si (SURFACE NUMBER) | Ri (CURVATURE RADIUS) | Di (SURFACE SEPARATION) | Ndj (REFRACTIVE INDEX) | νdj (ABBE NUMBER) |
| 0 (APERTURE STOP) | — | -0.10 | | |
| *1 | 1.205 | 0.66 | 1.510 | 56.2 |
| *2 | 2.604 | 0.76 | | |
| *3 | -1.500 | 0.50 | 1.650 | 27 |
| *4 | -1.682 | 0.14 | | |
| *5 | 2.028 | 0.88 | 1.532 | 55.4 |
| *6 | 1.626 | 0.50 | | |
| 7 | ∞ | 0.30 | 1.516 | 64.1 |
| 8 | ∞ | 0.63 | | |

(*: ASPHERIC SURFACE) (f=3.70, FNo.=3.5)

FIG. 21

| EXAMPLE 5: ASPHERIC SURFACE DATA | | | |
|---|---|---|---|
| ASPHERIC SURFACE COEFFICIENT | SURFACE NUMBER | | |
| | 1ST SURFACE | 2ND SURFACE | 3RD SURFACE |
| K | 1.260E+00 | 8.000E+00 | 1.000E+00 |
| A3 | -8.901E-03 | 3.003E-03 | 1.887E-02 |
| A4 | 6.973E-02 | 3.777E-02 | 7.785E-03 |
| A5 | -8.960E-02 | 8.151E-02 | 2.382E-04 |
| A6 | -1.458E-01 | 7.538E-02 | 1.155E-02 |
| A7 | 4.005E-01 | -2.079E-01 | 1.851E-02 |
| A8 | -1.102E-01 | 2.593E-01 | 2.703E-02 |
| A9 | 3.188E-01 | -9.199E-01 | 1.627E-02 |
| A10 | -6.620E-01 | 1.362E+00 | -5.130E-02 |
| | 4TH SURFACE | 5TH SURFACE | 6TH SURFACE |
| K | -2.360E+00 | -4.189E-01 | -4.147E-01 |
| A3 | -1.593E-01 | -2.705E-01 | -9.078E-02 |
| A4 | 3.451E-02 | 8.237E-03 | -1.409E-01 |
| A5 | -1.108E-02 | 6.680E-02 | 9.330E-02 |
| A6 | 6.711E-02 | 1.192E-02 | 8.255E-04 |
| A7 | 1.459E-02 | -1.391E-02 | -1.320E-02 |
| A8 | 1.329E-02 | -4.249E-03 | -2.499E-03 |
| A9 | 1.127E-03 | 1.990E-03 | 4.173E-03 |
| A10 | -1.510E-02 | 1.050E-04 | -9.464E-04 |

FIG. 22

| Si (SURFACE NUMBER) | Ri (CURVATURE RADIUS) | Di (SURFACE SEPARATION) | Ndj (REFRACTIVE INDEX) | νdj (ABBE NUMBER) |
|---|---|---|---|---|
| 0 (APERTURE STOP) | — | −0.10 | | |
| *1 | 1.093 | 0.66 | 1.532 | 55.4 |
| *2 | 2.362 | 0.76 | | |
| *3 | −2.153 | 0.59 | 1.606 | 27 |
| *4 | −2.348 | 0.19 | | |
| *5 | 3.830 | 0.86 | 1.532 | 55.4 |
| *6 | 1.636 | 0.50 | | |
| 7 | ∞ | 0.30 | 1.516 | 64.1 |
| 8 | ∞ | 0.28 | | |

EXAMPLE 6: BASIC LENS DATA (∗: ASPHERIC SURFACE) (f=3.84, FNo.=3.5)

FIG. 23

EXAMPLE 6: ASPHERIC SURFACE DATA

| ASPHERIC SURFACE COEFFICIENT | SURFACE NUMBER | | |
|---|---|---|---|
| | 1ST SURFACE | 2ND SURFACE | 3RD SURFACE |
| K | 1.811E+00 | 8.000E+00 | 1.897E−01 |
| A3 | −8.570E−03 | 1.712E−02 | 6.311E−03 |
| A4 | 2.715E−02 | 1.393E−02 | −2.228E−02 |
| A5 | −2.230E−01 | 9.136E−02 | −1.128E−01 |
| A6 | 3.791E−02 | 1.131E−01 | 4.489E−04 |
| A7 | 2.743E−01 | −2.556E−01 | −1.560E−01 |
| A8 | 6.622E−02 | 4.349E−01 | 1.888E−01 |
| A9 | −5.022E−01 | −1.133E+00 | 2.614E−01 |
| A10 | −2.729E−01 | 1.902E+00 | −4.599E−01 |
| | 4TH SURFACE | 5TH SURFACE | 6TH SURFACE |
| K | −1.104E+01 | −1.091E+01 | 1.935E−01 |
| A3 | −1.442E−01 | −2.539E−01 | −1.658E−01 |
| A4 | 3.404E−02 | 1.535E−02 | −1.179E−01 |
| A5 | −3.167E−02 | 5.673E−02 | 9.426E−02 |
| A6 | 4.244E−02 | 1.788E−02 | −2.639E−03 |
| A7 | −2.742E−03 | −1.321E−02 | −1.285E−02 |
| A8 | 1.047E−02 | −4.042E−03 | −3.524E−03 |
| A9 | 3.642E−04 | 2.308E−03 | 4.174E−03 |
| A10 | −3.048E−03 | −1.873E−04 | −8.071E−04 |

FIG. 24

| Si (SURFACE NUMBER) | Ri (CURVATURE RADIUS) | Di (SURFACE SEPARATION) | Ndj (REFRACTIVE INDEX) | νdj (ABBE NUMBER) |
|---|---|---|---|---|
| EXAMPLE 7: BASIC LENS DATA | | | | |
| 0 (APERTURE STOP) | — | -0.07 | | |
| *1 | 1.076 | 0.69 | 1.532 | 55.4 |
| *2 | 1.982 | 0.76 | | |
| *3 | -1.924 | 0.60 | 1.606 | 27 |
| *4 | -2.256 | 0.15 | | |
| *5 | 2.711 | 0.69 | 1.532 | 55.4 |
| *6 | 2.035 | 0.50 | | |
| 7 | ∞ | 0.30 | 1.516 | 64.1 |
| 8 | ∞ | 0.57 | | |

(*: ASPHERIC SURFACE) (f=3.88, FNo.=3.5)

FIG. 25

EXAMPLE 7: ASPHERIC SURFACE DATA

| ASPHERIC SURFACE COEFFICIENT | 1ST SURFACE | 2ND SURFACE | 3RD SURFACE |
|---|---|---|---|
| K | 1.752E+00 | 7.959E+00 | -1.732E+00 |
| A3 | -1.524E-03 | 2.649E-03 | -3.257E-02 |
| A4 | -1.192E-02 | 2.690E-02 | 2.329E-02 |
| A5 | -1.083E-01 | 6.184E-02 | -8.572E-02 |
| A6 | -4.539E-02 | 2.840E-02 | -1.407E-01 |
| A7 | 2.244E-01 | -1.262E-01 | -1.039E-01 |
| A8 | 6.126E-02 | 3.110E-01 | 2.444E-01 |
| A9 | -5.948E-01 | -1.177E+00 | 3.572E-01 |
| A10 | -9.394E-03 | 1.284E+00 | -5.362E-01 |

| | 4TH SURFACE | 5TH SURFACE | 6TH SURFACE |
|---|---|---|---|
| K | -9.125E+00 | -8.232E+00 | 4.985E-03 |
| A3 | -1.665E-01 | -2.439E-01 | -1.032E-01 |
| A4 | 2.027E-02 | 8.167E-03 | -1.323E-01 |
| A5 | -1.784E-02 | 6.298E-02 | 8.578E-02 |
| A6 | 5.290E-02 | 1.681E-02 | 6.704E-04 |
| A7 | 8.340E-04 | -1.352E-02 | -1.429E-02 |
| A8 | 8.222E-03 | -4.453E-03 | -2.211E-03 |
| A9 | 4.401E-03 | 2.131E-03 | 3.773E-03 |
| A10 | -1.186E-02 | -5.421E-05 | -7.088E-04 |

FIG. 26

| EXAMPLE 8: BASIC LENS DATA | | | | |
|---|---|---|---|---|
| Si (SURFACE NUMBER) | Ri (CURVATURE RADIUS) | Di (SURFACE SEPARATION) | Ndj (REFRACTIVE INDEX) | νdj (ABBE NUMBER) |
| 0 (APERTURE STOP) | — | -0.07 | | |
| *1 | 1.060 | 0.69 | 1.532 | 55.4 |
| *2 | 1.831 | 0.72 | | |
| *3 | -1.946 | 0.57 | 1.606 | 27 |
| *4 | -2.221 | 0.15 | | |
| *5 | 2.646 | 0.62 | 1.532 | 55.4 |
| *6 | 2.189 | 0.50 | | |
| 7 | ∞ | 0.30 | 1.516 | 64.1 |
| 8 | ∞ | 0.72 | | |

(*: ASPHERIC SURFACE ) (f=3.88, FNo.=3.5)

FIG. 27

| EXAMPLE 8: ASPHERIC SURFACE DATA | | | |
|---|---|---|---|
| ASPHERIC SURFACE COEFFICIENT | SURFACE NUMBER | | |
| | 1ST SURFACE | 2ND SURFACE | 3RD SURFACE |
| K | 1.744E+00 | 7.000E+00 | -2.119E+00 |
| A3 | -2.136E-03 | 1.206E-03 | -3.949E-02 |
| A4 | -1.202E-02 | 2.877E-02 | 2.509E-02 |
| A5 | -1.102E-01 | 6.363E-02 | -9.099E-02 |
| A6 | -4.979E-02 | 1.887E-02 | -1.452E-01 |
| A7 | 2.182E-01 | -1.474E-01 | -1.068E-01 |
| A8 | 5.364E-02 | 2.915E-01 | 2.432E-01 |
| A9 | -6.055E-01 | -1.182E+00 | 3.578E-01 |
| A10 | -2.856E-02 | 1.311E+00 | -5.334E-01 |
| | 4TH SURFACE | 5TH SURFACE | 6TH SURFACE |
| K | -8.187E+00 | -8.905E+00 | -6.175E-02 |
| A3 | -1.669E-01 | -2.447E-01 | -1.016E-01 |
| A4 | 1.729E-02 | 8.111E-03 | -1.331E-01 |
| A5 | -1.943E-02 | 6.297E-02 | 8.567E-02 |
| A6 | 5.201E-02 | 1.681E-02 | 6.932E-04 |
| A7 | 2.600E-04 | -1.352E-02 | -1.427E-02 |
| A8 | 7.819E-03 | -4.449E-03 | -2.199E-03 |
| A9 | 4.097E-03 | 2.135E-03 | 3.778E-03 |
| A10 | -1.210E-02 | -5.103E-05 | -7.064E-04 |

FIG. 28

| EXAMPLE 9: BASIC LENS DATA ||||| 
|---|---|---|---|---|
| Si (SURFACE NUMBER) | Ri (CURVATURE RADIUS) | Di (SURFACE SEPARATION) | Ndj (REFRACTIVE INDEX) | νdj (ABBE NUMBER) |
| 0 (APERTURE STOP) | — | -0.10 | | |
| *1 | 1.144 | 0.64 | 1.510 | 56.2 |
| *2 | 2.492 | 0.79 | | |
| 3 | -1.542 | 0.50 | 1.532 | 55.4 |
| *4 | -1.604 | 0.17 | | |
| *5 | 2.645 | 0.91 | 1.532 | 55.4 |
| *6 | 1.577 | 0.50 | | |
| 7 | ∞ | 0.30 | 1.516 | 64.1 |
| 8 | ∞ | 0.43 | | |

(*: ASPHERIC SURFACE ) (f=3.75, FNo.=3.5)

FIG. 29

| EXAMPLE 9: ASPHERIC SURFACE DATA ||||
|---|---|---|---|
| ASPHERIC SURFACE COEFFICIENT | SURFACE NUMBER |||
| | 1ST SURFACE | 2ND SURFACE | 4TH SURFACE |
| K | 1.517E+00 | 8.000E+00 | -3.493E+00 |
| A3 | -1.000E-02 | 1.080E-02 | -1.845E-01 |
| A4 | 6.141E-02 | 3.445E-02 | 3.546E-02 |
| A5 | -1.359E-01 | 9.765E-02 | -6.705E-03 |
| A6 | -6.977E-02 | 2.887E-02 | 5.865E-02 |
| A7 | 2.717E-01 | -1.441E-01 | 1.797E-02 |
| A8 | 2.312E-02 | 5.469E-01 | 2.158E-02 |
| A9 | 1.704E-01 | -1.331E+00 | -5.404E-04 |
| A10 | -6.097E-01 | 1.631E+00 | -1.537E-02 |
| | 5TH SURFACE | 6TH SURFACE | |
| K | -2.120E+00 | -1.454E-01 | |
| A3 | -2.477E-01 | -1.241E-01 | |
| A4 | 1.001E-02 | -1.277E-01 | |
| A5 | 5.958E-02 | 9.216E-02 | |
| A6 | 1.641E-02 | -6.990E-04 | |
| A7 | -1.628E-02 | -1.264E-02 | |
| A8 | -4.600E-03 | -2.975E-03 | |
| A9 | 2.152E-03 | 4.086E-03 | |
| A10 | 3.282E-04 | -8.601E-04 | |

FIG. 30

| EXAMPLE 10: BASIC LENS DATA | | | | |
|---|---|---|---|---|
| Si (SURFACE NUMBER) | Ri (CURVATURE RADIUS) | Di (SURFACE SEPARATION) | Ndj (REFRACTIVE INDEX) | νdj (ABBE NUMBER) |
| 0 (APERTURE STOP) | — | −0.10 | | |
| *1 | 1.208 | 0.66 | 1.510 | 56.2 |
| *2 | 3.202 | 0.77 | | |
| *3 | −1.602 | 0.50 | 1.750 | 20 |
| *4 | −1.814 | 0.20 | | |
| *5 | 2.620 | 0.96 | 1.532 | 55.4 |
| *6 | 1.680 | 0.50 | | |
| 7 | ∞ | 0.30 | 1.516 | 64.1 |
| 8 | ∞ | 0.45 | | |

(*: ASPHERIC SURFACE) (f=3.71, FNo.=3.5)

FIG. 31

| EXAMPLE 10: ASPHERIC SURFACE DATA | | | |
|---|---|---|---|
| ASPHERIC SURFACE COEFFICIENT | SURFACE NUMBER | | |
| | 1ST SURFACE | 2ND SURFACE | 3RD SURFACE |
| K | 1.167E+00 | 8.000E+00 | 1.000E+00 |
| A3 | −2.784E−03 | 1.728E−02 | −6.933E−03 |
| A4 | 5.373E−02 | 1.087E−02 | 7.184E−03 |
| A5 | −9.289E−02 | 7.077E−02 | −4.780E−03 |
| A6 | −1.129E−01 | 1.117E−01 | 6.323E−03 |
| A7 | 4.358E−01 | −2.519E−01 | 2.255E−02 |
| A8 | −1.176E−01 | 7.473E−01 | 4.673E−02 |
| A9 | 3.017E−01 | −1.443E+00 | 1.275E−02 |
| A10 | −7.356E−01 | 1.301E+00 | −9.456E−02 |
| | 4TH SURFACE | 5TH SURFACE | 6TH SURFACE |
| K | −3.579E+00 | −5.928E−01 | −6.428E−02 |
| A3 | −1.526E−01 | −2.663E−01 | −9.976E−02 |
| A4 | 3.347E−02 | 1.198E−02 | −1.412E−01 |
| A5 | −1.088E−02 | 6.657E−02 | 9.153E−02 |
| A6 | 6.418E−02 | 1.118E−02 | 5.943E−04 |
| A7 | 1.294E−02 | −1.410E−02 | −1.327E−02 |
| A8 | 1.214E−02 | −4.211E−03 | −2.622E−03 |
| A9 | 1.349E−03 | 1.906E−03 | 4.214E−03 |
| A10 | −1.218E−02 | 2.225E−04 | −9.415E−04 |

FIG. 32

| EXAMPLE 11: BASIC LENS DATA ||||| 
|---|---|---|---|---|
| Si (SURFACE NUMBER) | Ri (CURVATURE RADIUS) | Dj (SURFACE SEPARATION) | Ndj (REFRACTIVE INDEX) | νdj (ABBE NUMBER) |
| 0(APERTURE STOP) | — | -0.10 | | |
| *1 | 1.089 | 0.60 | 1.532 | 55.4 |
| *2 | 2.454 | 0.78 | | |
| *3 | -2.378 | 0.61 | 1.750 | 25 |
| *4 | -2.585 | 0.20 | | |
| *5 | 3.619 | 0.93 | 1.532 | 55.4 |
| *6 | 1.589 | 0.50 | | |
| 7 | ∞ | 0.30 | 1.516 | 64.1 |
| 8 | ∞ | 0.21 | | |

(*:ASPHERIC SURFACE) (f=3.70, FNo.=3.5)

FIG. 33

| EXAMPLE 11: ASPHERIC SURFACE DATA ||||
|---|---|---|---|
| ASPHERIC SURFACE COEFFICIENT | SURFACE NUMBER |||
| | 1ST SURFACE | 2ND SURFACE | 3RD SURFACE |
| K | 1.842E+00 | 8.000E+00 | -4.529E+00 |
| A3 | -8.418E-03 | 1.914E-02 | -6.839E-03 |
| A4 | 3.023E-02 | 1.798E-02 | -8.038E-03 |
| A5 | -2.116E-01 | 1.196E-01 | -1.111E-01 |
| A6 | 3.355E-02 | 1.290E-01 | -7.374E-03 |
| A7 | 2.698E-01 | -2.596E-01 | -1.657E-01 |
| A8 | 1.168E-01 | 3.690E-01 | 1.892E-01 |
| A9 | -5.603E-01 | -1.119E+00 | 2.918E-01 |
| A10 | -2.838E-01 | 2.185E+00 | -4.121E-01 |
| | 4TH SURFACE | 5TH SURFACE | 6TH SURFACE |
| K | -1.746E+01 | -1.008E+01 | 2.510E-01 |
| A3 | -1.300E-01 | -2.541E-01 | -1.780E-01 |
| A4 | 2.942E-02 | 1.829E-02 | -1.046E-01 |
| A5 | -3.204E-02 | 5.611E-02 | 9.110E-02 |
| A6 | 4.285E-02 | 1.752E-02 | -4.379E-03 |
| A7 | -3.687E-03 | -1.351E-02 | -1.205E-02 |
| A8 | 9.526E-03 | -3.865E-03 | -3.610E-03 |
| A9 | 6.596E-04 | 2.234E-03 | 4.232E-03 |
| A10 | -3.401E-03 | -1.634E-04 | -8.479E-04 |

FIG. 34

| | COND.EXP.(1) f1/f | COND.EXP.(2) \|f2/f\| | COND.EXP.(3) SA/Y | COND.EXP.(4) TL/2Y | COND.EXP.(5) (\|R2\|−R1)/ (R1+\|R2\|) | COND.EXP.(6) Nd2 | COND.EXP.(7) f3/f |
|---|---|---|---|---|---|---|---|
| EXAMPLE 1 | 0.89 | 13.60 | 0.071 | 0.78 | 0.36 | 1.606 | −2.04 |
| EXAMPLE 2 | 0.87 | 32.53 | 0.074 | 0.79 | 0.36 | 1.606 | −2.54 |
| EXAMPLE 3 | 0.89 | 166.84 | 0.074 | 0.80 | 0.36 | 1.606 | −2.63 |
| EXAMPLE 4 | 0.94 | 17.69 | 0.065 | 0.81 | 0.37 | 1.606 | −2.99 |
| EXAMPLE 5 | 1.02 | 69.19 | 0.068 | 0.84 | 0.37 | 1.650 | −17.23 |
| EXAMPLE 6 | 0.84 | 76.73 | 0.060 | 0.79 | 0.37 | 1.606 | −1.62 |
| EXAMPLE 7 | 0.90 | 17.62 | 0.069 | 0.82 | 0.30 | 1.606 | −6.13 |
| EXAMPLE 8 | 0.93 | 29.73 | 0.066 | 0.81 | 0.27 | 1.606 | −11.57 |
| EXAMPLE 9 | 0.95 | 11.21 | 0.070 | 0.81 | 0.37 | 1.606 | −2.79 |
| EXAMPLE 10 | 0.92 | 555.99 | 0.064 | 0.83 | 0.45 | 1.532 | −3.66 |
| EXAMPLE 11 | 0.86 | 40.98 | 0.054 | 0.79 | 0.39 | 1.750 | −1.71 |

EXAMPLE 1

SPHERICAL ABERRATION

ASTIGMATISM

DISTORTION

EXAMPLE 2

SPHERICAL ABERRATION

ASTIGMATISM

DISTORTION

EXAMPLE 3

SPHERICAL ABERRATION

ASTIGMATISM

DISTORTION

EXAMPLE 4

SPHERICAL ABERRATION

ASTIGMATISM

DISTORTION

EXAMPLE 5

FNO.=3.50
g-LINE
d-LINE
C-LINE
-0.2mm  0.2mm
SPHERICAL ABERRATION

ω=34.6°
SAGITTAL
TANGENTIAL
-0.2mm  0.2mm
ASTIGMATISM

ω=34.6°
-5%  5%
DISTORTION

EXAMPLE 6

FNO.=3.50
g-LINE
d-LINE
C-LINE
-0.2mm  0.2mm
SPHERICAL ABERRATION

ω=33.5°
SAGITTAL
TANGENTIAL
-0.2mm  0.2mm
ASTIGMATISM

ω=33.5°
-5%  5%
DISTORTION

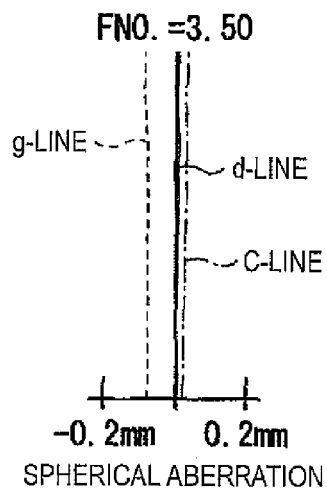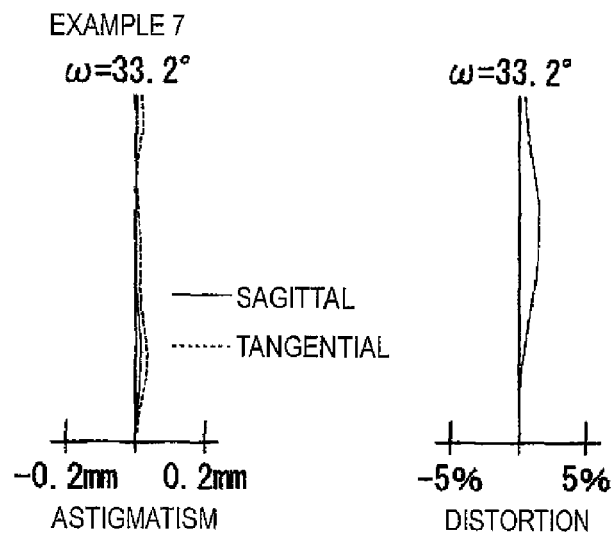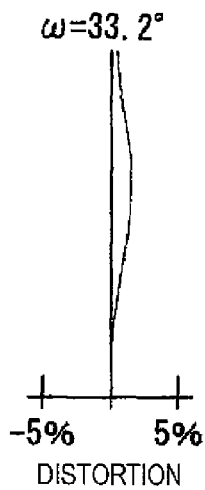
FIG. 41A  FIG. 41B  FIG. 41C
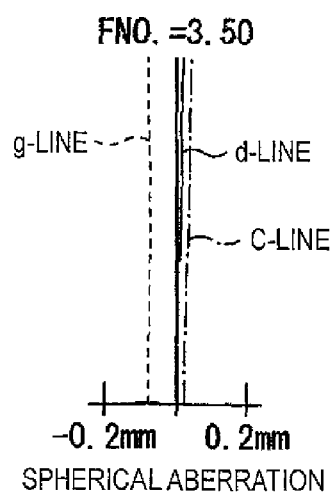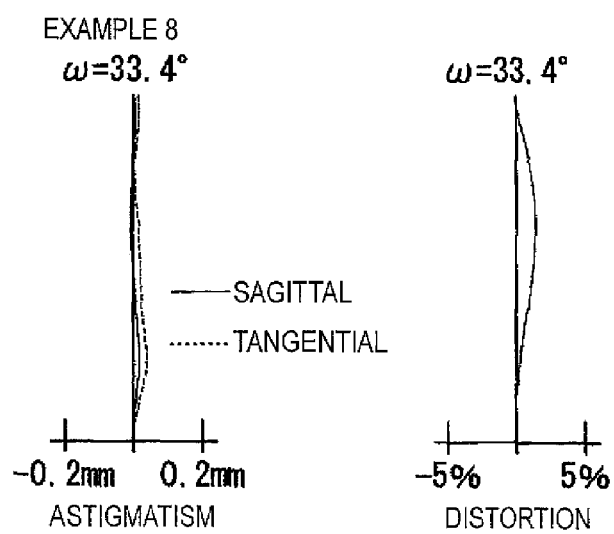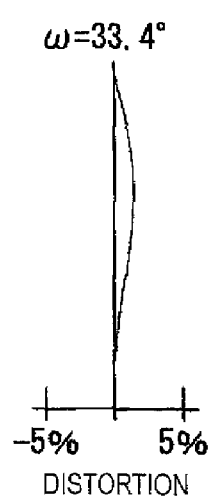
FIG. 42A  FIG. 42B  FIG. 42C EXAMPLE 9
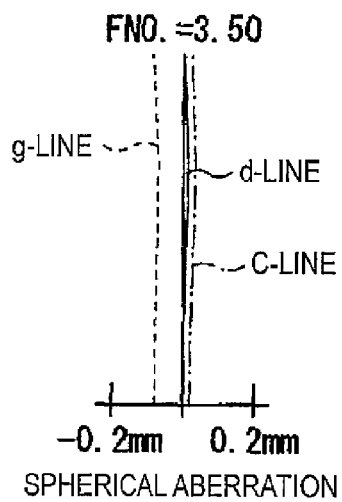
FNO.=3.50
SPHERICAL ABERRATION
FIG. 43A
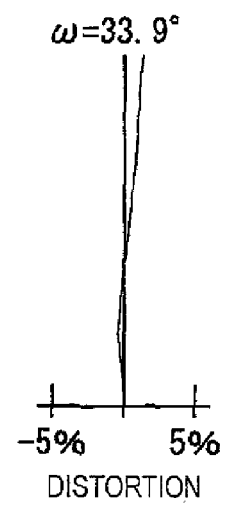
ω=33.9°
ASTIGMATISM
FIG. 43B
ω=33.9°
DISTORTION
FIG. 43C
EXAMPLE 10
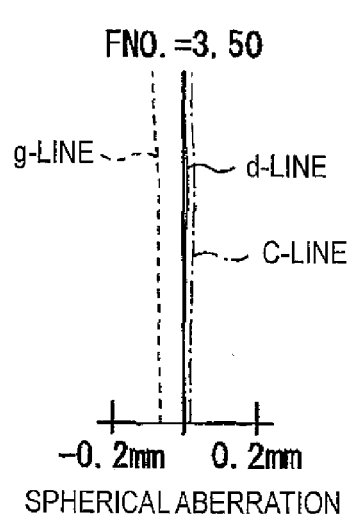
FNO.=3.50
SPHERICAL ABERRATION
FIG. 44A
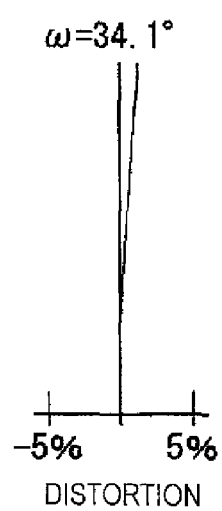
ω=34.1°
ASTIGMATISM
FIG. 44B
ω=34.1°
DISTORTION
FIG. 44C EXAMPLE 11
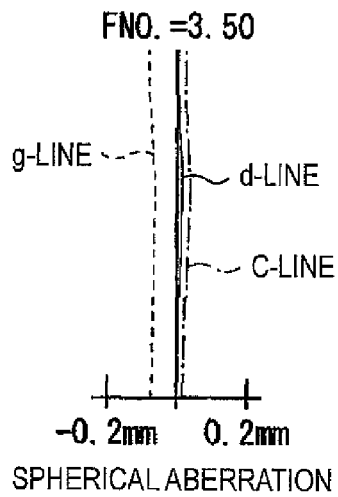
SPHERICAL ABERRATION
FIG. 45A
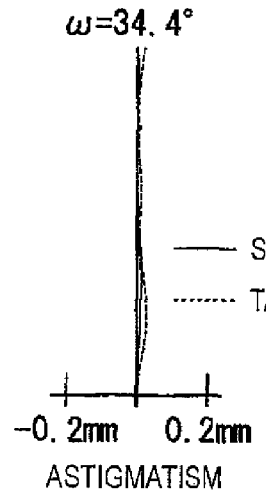
ASTIGMATISM
FIG. 45B
DISTORTION
FIG. 45C
FIG. 46
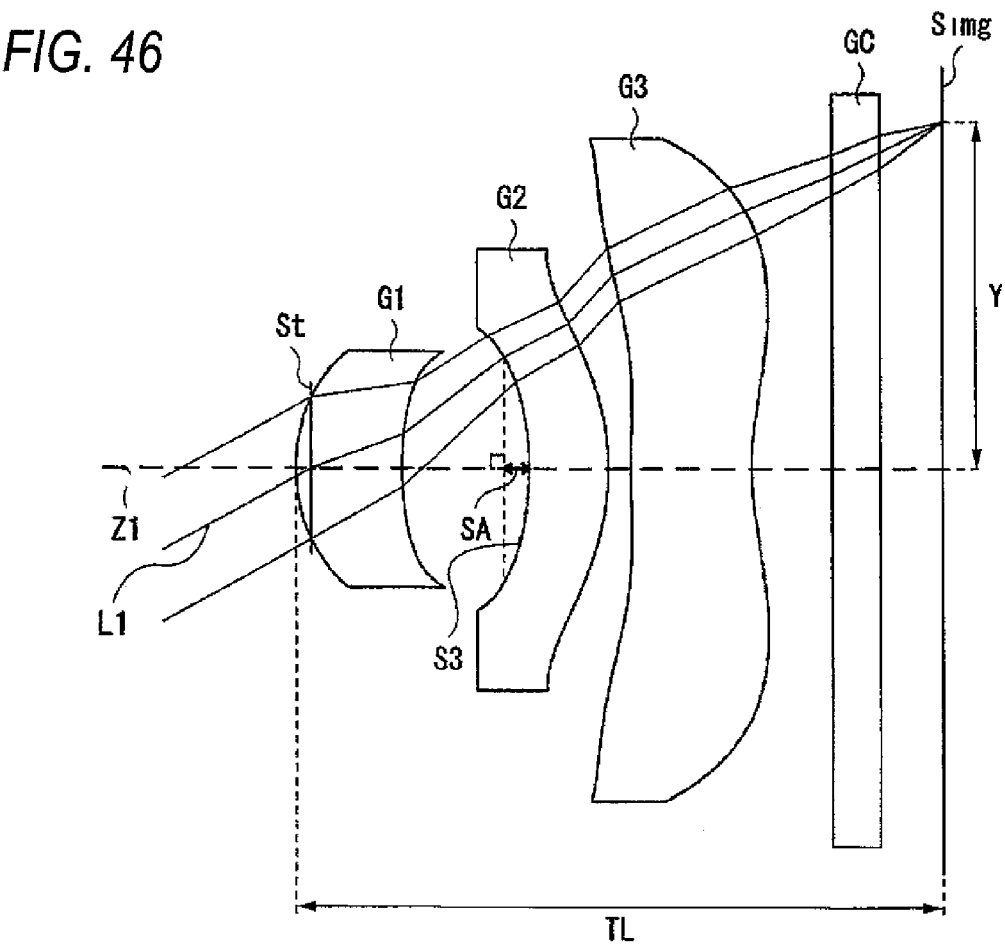

IMAGING LENS

CROSS-REFERENCE TO RELATED APPLICATIONS

This application is based upon and claims the benefit of priority from the Japanese Patent Application No. 2007-93306 filed on Mar. 30, 2007; the entire contents of which are incorporated herein by reference.

BACKGROUND OF THE INVENTION

1. Technical Field

The invention relates to a fixed-focus imaging lens that can be suitably mounted on a small-sized imaging apparatus such as (i) a digital camera using an imaging device such as a CCD (Charge Coupled Device) or a CMOS (Complementary Metal Oxide Semiconductor), (ii) a camera using a silver halide film, and the like.

2. Description of the Related Art

In recent years, as permeation of personal computers in homes or the like, a digital still camera (hereinafter, referred to as a "digital camera") capable of inputting image information, such as photographed scenes, persons, or the like, to the personal computer have come into wide use rapidly. As cellular phones are sophisticated, module cameras (portable module cameras) for inputting images have been often mounted on the cellular phones.

In such an imaging apparatus, an imaging device such as a CCD or a CMOS is used. With the recent development in miniaturization of the imaging devices, compactness is requested for such imaging apparatus and an imaging lens mounted thereon. Concurrently, since the number of pixels of the imaging device also increases, the imaging lenses are requested to have higher resolution and higher performance. JP 2004-302058 A (corresponding to US 2004/0190162 A), JP 2005-173319 A, JP 2005-227755 A and JP 2005-292235 A describe imaging lenses that has a three-lens configuration and that employs an aspheric lens surface, thereby achieving higher performance and compactness.

As described above, as recently miniaturization of the imaging device is further advanced and the number of pixels thereof further increases, particularly an imaging lens for a digital camera is requested to have higher resolution performance and a compact configuration. On the other hand, an imaging lens for a portable module camera has been primarily requested to be low in cost and compact in configuration. Recently, the number of pixels of an imaging device in a portable module camera also tends to increase. Thus, the imaging device in the portable module camera has been highly requested to have good performance.

It is therefore desired to develop a wide variety of lenses comprehensively improved in cost, image-formation performance and compactness. For example, it is desired to develop a low-cost and high-performance imaging lens having high performance with considering mounting it on a digital camera, while ensuring compactness for mounting on a portable module camera.

To meet these requests, for example, a lens configuration can be considered in which the number of lenses is three in order to secure compactness and low cost, and aspheric surfaces are used aggressively in order to secure high performance. In this case, the use of aspheric surfaces contributes to compactness and high performance. However, the aspheric surfaces are disadvantageous in manufacturing efficiency, and the cost may increase. It is, therefore, desired to take the manufacturing efficiency into consideration when the aspheric surfaces are used. The lenses described in the above listed documents have a three-lens configuration using aspheric surfaces. However, those lenses do not achieve a certain level of compatibility between good imaging performance and desirable compactness.

SUMMARY OF THE INVENTION

The invention has been made in view of the above circumstances and provides an imaging lens having high imaging performance, compact configuration and excellent manufacturing efficiency.

An imaging lens according to a first aspect of the invention includes, in order from an object side, a first lens, a second lens and a third lens. The first lens has a positive refractive power and has a meniscus shape with a convex surface directed to the object side thereof. The second lens has a concave object-side surface. The third lens has a negative refractive power in a vicinity of an optical axis. Each of the second and third lenses has at least one aspheric surface. The following conditional expressions are satisfied:

$$0.8 < f1/f < 1.2 \quad (1)$$

$$11 < |f2/f| \quad (2)$$

$$0.04 < SA/Y < 0.09 \quad (3)$$

$$TL/2Y < 0.9 \quad (4)$$

where f denotes a focal length of the entire system, f1 denotes a focal length of the first lens, f2 denotes a focal length of the second lens, SA denotes the amount of sag of the object-side surface of the second lens in a position where a principal ray passes the maximum image height, Y denotes the maximum image height, and TL denotes a distance from an object-side surface of the first lens to an image formation position.

In the imaging lens of the first aspect, while the lens configuration has small number of lenses, that is, three lenses, the shapes and refractive powers of the respective lenses are appropriately set. Also, the conditional expressions (1) to (4) are satisfied. Thereby, the power (refractive power) distribution between the first and second lenses and the surface shapes of the first and second lenses are optimized, thereby reducing the length of the entire lens system while securing manufacturing efficiency and thus correcting various aberrations. Specifically, the second lens has a relatively weak refractive power so as to satisfy the conditional expression (2). Also, the concave object-side surface of the second lens is set appropriately by satisfying the conditional expression (3). Thereby, the manufacturing sensitivity of the second lens can be lowered to facilitate surface processing, thereby lowering the assembly sensitivity of the entire lens system and thus improving manufacturing efficiency.

According to a second aspect of the invention, an imaging lens includes, in order from an object side, a first lens, a second lens and a third lens. The first lens has a positive refractive power and having a meniscus shape with a convex surface directed to the object side thereof. The second lens has a concave object-side surface. The third lens has a negative refractive power in a vicinity of an optical axis. Each of the second and third lenses has at least one aspheric surface. The following conditional expressions are satisfied:

$$0.8 < f1/f < 1.2 \quad (1)$$

$$11<|f2/f| \quad (2)$$

$$f3/f<-1.6 \quad (7)$$

where f denotes a focal length of the entire system,
f1 denotes a focal length of the first lens,
f2 denotes a focal length of the second lens, and
f3 denotes a focal length of the third lens.

In the imaging lens of the second aspect, while the lens configuration has small number of lenses, that is, three lenses, the shapes and refractive powers of the respective lenses are appropriately set. Also, the conditional expressions (1), (2) and (7) are satisfied. Thereby, the power (refractive power) distribution among the first to third lenses and the surface shapes of the first to third lenses are optimized, thereby reducing the length of the entire lens system while securing manufacturing efficiency and thus correcting various aberrations. Also, the manufacturing sensitivity of the second lens is lowered and the assembly sensitivity of the entire lens system is lowered, which improves manufacturing efficiency.

Also, in the imaging lens of any of the first and second aspects, it is preferable that the above imaging lens satisfies the following conditional expression.

$$0<(|R2|-R1)/(|R2|+R1)<0.5 \quad (5)$$

where

R1 denotes a radius of curvature of the object-side surface of the first lens in the vicinity of the optical axis, and R2 denotes a radius of curvature of an image-side surface of the first lens in the vicinity of the optical axis.

With this configuration, the shapes of the object-side surface and the image-side surface of the first lens are optimized. It is therefore advantageous in correcting the various aberrations while securing manufacturing efficiency of the second lens.

Furthermore, in the imaging lens of any of the first and second aspects, it is preferable that the object-side surface of the second lens has an aspheric shape such that a negative refractive power thereof becomes stronger from the vicinity of the optical axis toward a periphery of the object-side surface of the second lens and that the image-side surface of the second lens has an aspheric shape such that a positive refractive power thereof becomes weaker from the vicinity of the optical axis toward a periphery of the image-side surface of the second lens. With this configuration, it becomes easy to correct the various aberrations while reducing the length of the entire lens system.

Also, in the imaging lens of any of the first and second aspects, the object-side surface of the second lens may have a spherical shape. With this configuration, it is easy to secure the manufacturing efficiency.

Furthermore, in the imaging lens of any of the first and second aspects, it is preferable to satisfy the following conditional expression.

$$1.68<Nd_2 \quad (6)$$

where $Nd_2$ denotes a refractive index of the second lens at d-line of 587.6 nm in wavelength.

With this configuration, the material of the second lens is optimized and thus the various aberrations such as curvature of an image formation surface are properly corrected.

According to another aspect of the invention, an imaging apparatus includes the imaging lens of any of the first and second aspects, and an imaging device that outputs an imaging signal in accordance with an optical image formed by the imaging lens.

According to the imaging lens of any of the first and second aspects, with the configuration having the small-number of lenses, that is, the three lenses in total, the shapes and refractive powers of the respective lens elements are appropriately set, and the predetermined conditional expressions are satisfied. It is, therefore, possible to secure manufacturing efficiency, especially of the second lens. Accordingly, it is possible to provide a lens system having good aberration correction performance, a compact configuration and excellent manufacturing efficiency. Also, it is possible to provide a compact and high-performance imaging apparatus.

BRIEF DESCRIPTION OF THE DRAWINGS

FIG. 12 is a diagram showing basic lens data of the imaging lens of Example 1.

FIG. 13 is a diagram showing lens data relating to an aspheric surface of the imaging lens of Example 1.

FIG. 14 is a diagram showing basic lens data of the imaging lens of Example 2.

FIG. 15 is a diagram showing lens data relating to an aspheric surface of the imaging lens of Example 2.

FIG. 16 is a diagram showing basic lens data of the imaging lens of Example 3.

FIG. 17 is a diagram showing lens data relating to an aspheric surface of the imaging lens of Example 3.

FIG. 18 is a diagram showing basic lens data of the imaging lens of Example 4.

FIG. 19 is a diagram showing lens data relating to an aspheric surface of the imaging lens of Example 4.

FIG. 20 is a diagram showing basic lens data of the imaging lens of Example 5.

FIG. 21 is a diagram showing lens data relating to an aspheric surface of the imaging lens of Example 5.

FIG. 22 is a diagram showing basic lens data of the imaging lens of Example 6.

FIG. 23 is a diagram showing lens data relating to an aspheric surface of the imaging lens of Example 6.

FIG. 24 is a diagram showing basic lens data of the imaging lens of Example 7.

FIG. 25 is a diagram showing lens data relating to an aspheric surface of the imaging lens of Example 7.

FIG. 26 is a diagram showing basic lens data of the imaging lens of Example 8.

FIG. 27 is a diagram showing lens data relating to an aspheric surface of the imaging lens of Example 8.

FIG. 28 is a diagram showing basic lens data of the imaging lens of Example 9.

FIG. 29 is a diagram showing lens data relating to an aspheric surface of the imaging lens of Example 9.

FIG. 30 is a diagram showing basic lens data of the imaging lens of Example 10.

FIG. 31 is a diagram showing lens data relating to an aspheric surface of the imaging lens of Example 10.

FIG. 32 is a diagram showing basic lens data of the imaging lens of Example 11.

FIG. 33 is a diagram showing lens data relating to an aspheric surface of the imaging lens of Example 11.

FIG. 34 is a diagram showing numeric values, in the respective Examples, corresponding to conditional expressions.

FIGS. 35A to 35C are aberration diagrams showing various aberrations in the imaging lens according to Example 1 of the invention, in which FIG. 35A is a spherical aberration diagram, FIG. 35B is an astigmatism diagram, and FIG. 35C is a distortion diagram.

FIGS. 36A to 36C are aberration diagrams showing various aberrations in the imaging lens according to Example 2 of the invention, in which FIG. 36A is a spherical aberration diagram, FIG. 36B is an astigmatism diagram, and FIG. 36C is a distortion diagram.

FIGS. 37A to 37C are aberration diagrams showing various aberrations in the imaging lens according to Example 3 of the invention, in which FIG. 37A is a spherical aberration diagram, FIG. 37B is an astigmatism diagram, and FIG. 37C is a distortion diagram.

FIGS. 38A to 38C are aberration diagrams showing various aberrations in the imaging lens according to Example 4 of the invention, in which FIG. 38A is a spherical aberration diagram, FIG. 38B is an astigmatism diagram, and FIG. 38C is a distortion diagram.

FIGS. 39A to 39C are aberration diagrams showing various aberrations in the imaging lens according to Example 5 of the invention, in which FIG. 39A is a spherical aberration diagram, FIG. 39B is an astigmatism diagram, and FIG. 39C is a distortion diagram.

FIGS. 40A to 40C are aberration diagrams showing various aberrations in the imaging lens according to Example 6 of the invention, in which FIG. 40A is a spherical aberration diagram, FIG. 40B is an astigmatism diagram, and FIG. 40C is a distortion diagram.

FIGS. 41A to 41C are aberration diagrams showing various aberrations in the imaging lens according to Example 7 of the invention, in which FIG. 41A is a spherical aberration diagram, FIG. 41B is an astigmatism diagram, and FIG. 41C is a distortion diagram.

FIGS. 42A to 42C are aberration diagrams showing various aberrations in the imaging lens according to Example 8 of the invention, in which FIG. 42A is a spherical aberration diagram, FIG. 42B is an astigmatism diagram, and FIG. 42C is a distortion diagram.

FIGS. 43A to 43C are aberration diagrams showing various aberrations in the imaging lens according to Example 9 of the invention, in which FIG. 43A is a spherical aberration diagram, FIG. 43B is an astigmatism diagram, and FIG. 43C is a distortion diagram.

FIGS. 44A to 44C are aberration diagrams showing various aberrations in the imaging lens according to Example 10 of the invention, in which FIG. 44A is a spherical aberration diagram, FIG. 44B is an astigmatism diagram, and FIG. 44C is a distortion diagram.

FIGS. 45A to 45C are aberration diagrams showing various aberrations in the imaging lens according to Example 11 of the invention, in which FIG. 45A is a spherical aberration diagram, FIG. 45B is an astigmatism diagram, and FIG. 45C is a distortion diagram.

FIG. 46 is a diagram for explaining the concepts of SA, Y and TL.

DETAILED DESCRIPTION OF EMBODIMENTS OF THE INVENTION

Exemplary embodiments of the invention will be described below in detail with reference to the drawings.

Figure 1:
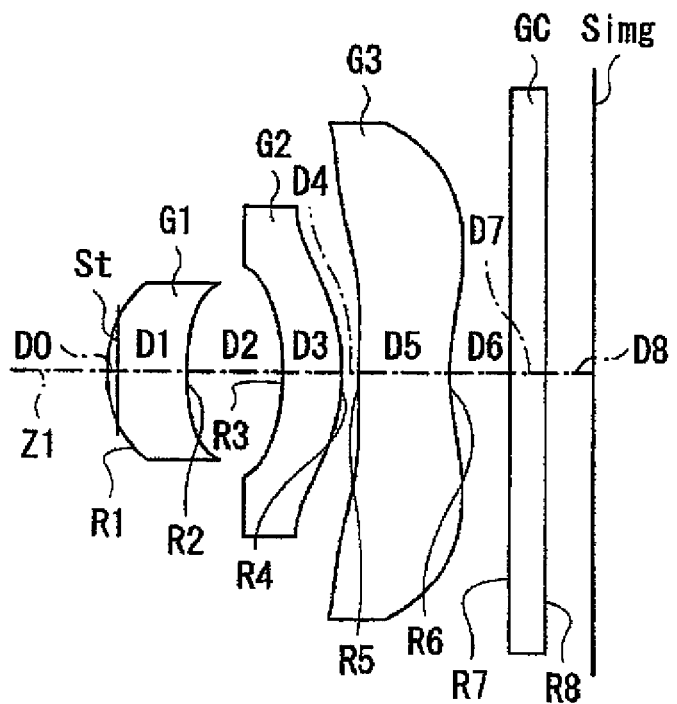
FIG. 1 is a section view showing the lens configuration of an imaging lens according to Example 1 of the invention.
Figure 2:
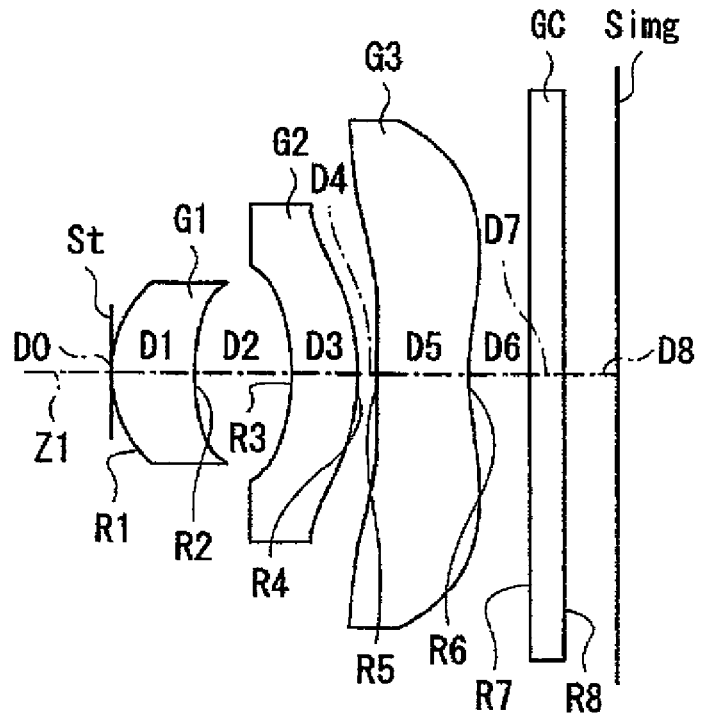
FIG. 2 is a section view showing the lens configuration of an imaging lens according to Example 2 of the invention.
Figure 3:
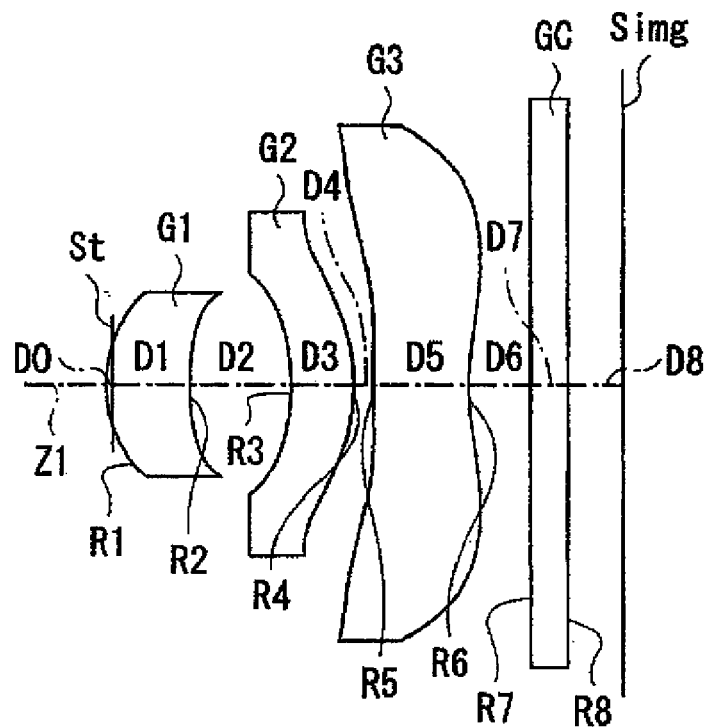
FIG. 3 is a section view showing the lens configuration of an imaging lens according to Example 3 of the invention.
Figure 4:
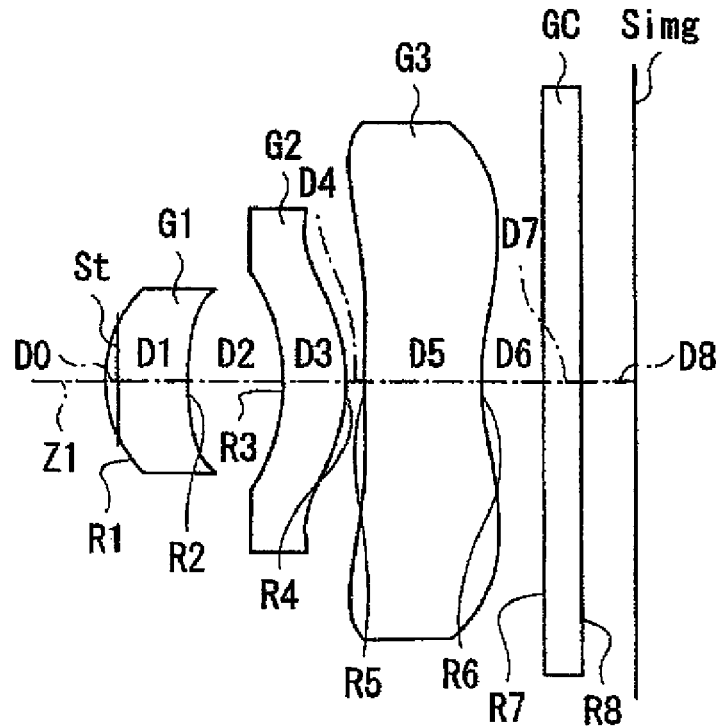
FIG. 4 is a section view showing the lens configuration of an imaging lens according to Example 4 of the invention.
Figure 5:
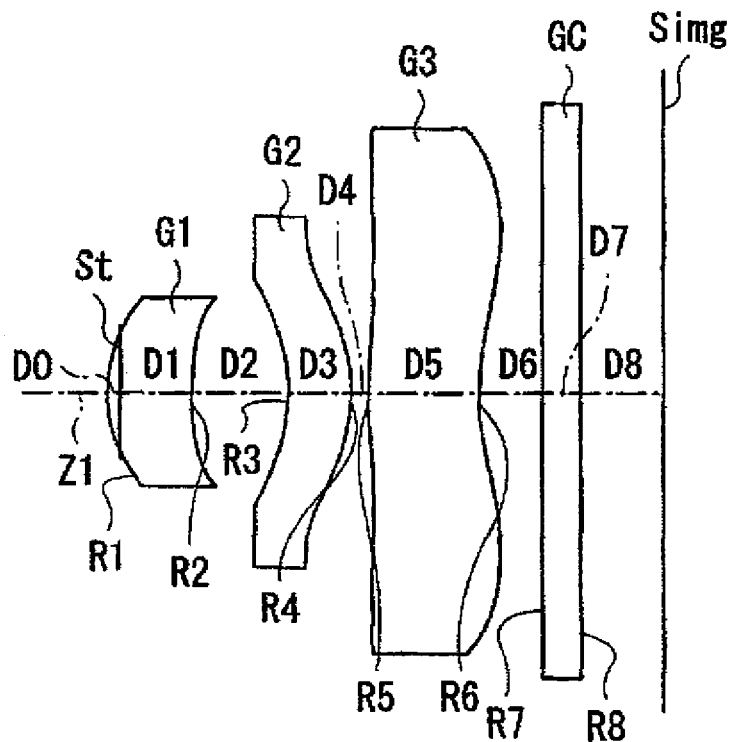
FIG. 5 is a section view showing the lens configuration of an imaging lens according to Example 5 of the invention.
Figure 6:
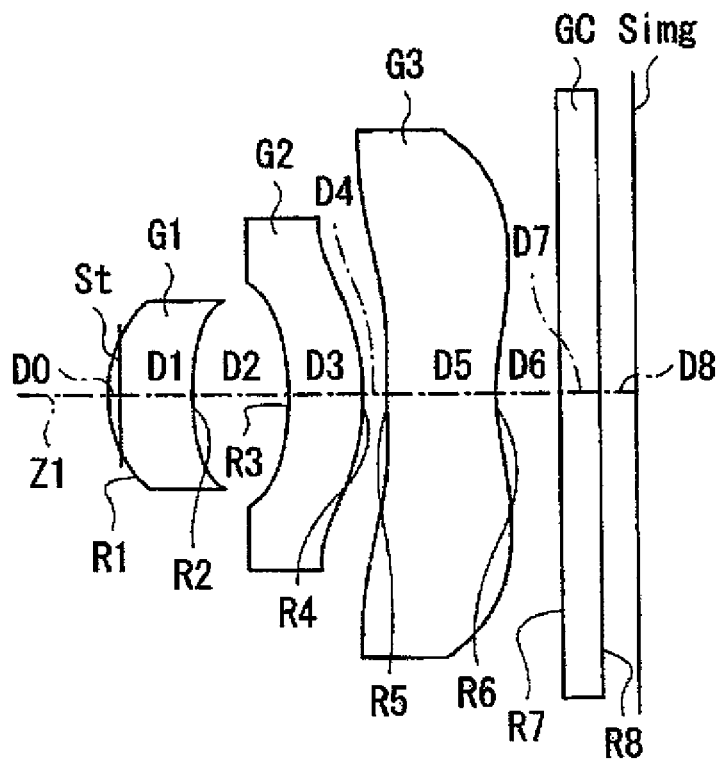
FIG. 6 is a section view showing the lens configuration of an imaging lens according to Example 6 of the invention.
Figure 7:
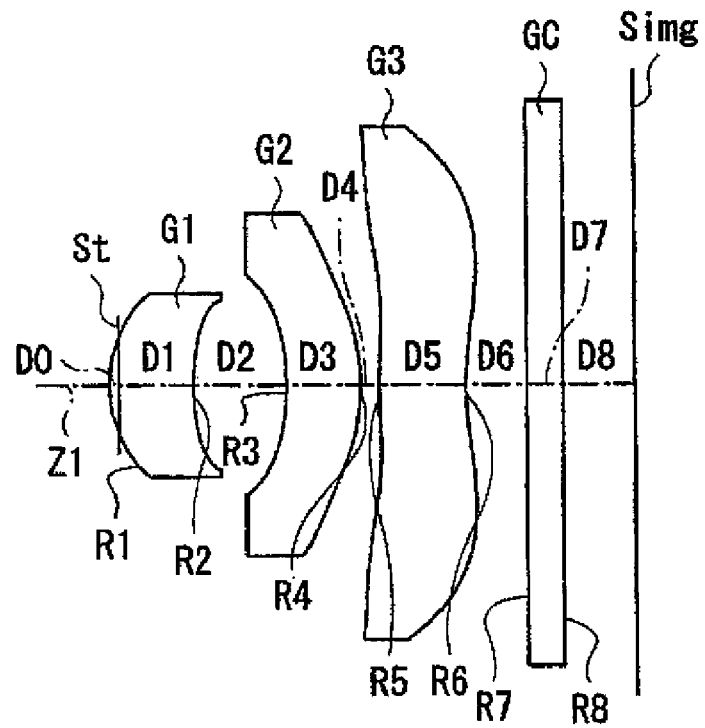
FIG. 7 is a section view showing the lens configuration of an imaging lens according to Example 7 of the invention.
Figure 8:
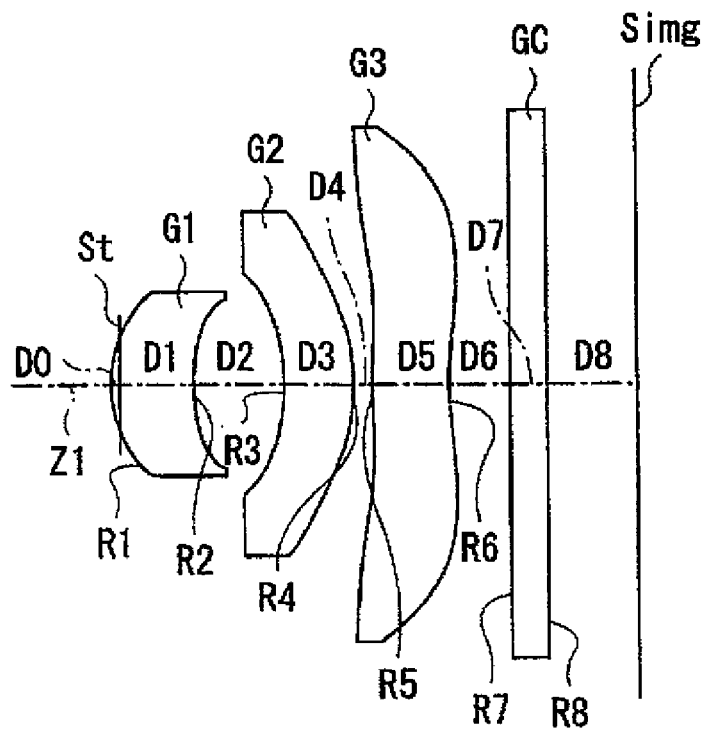
FIG. 8 is a section view showing the lens configuration of an imaging lens according to Example 8 of the invention.
Figure 9:
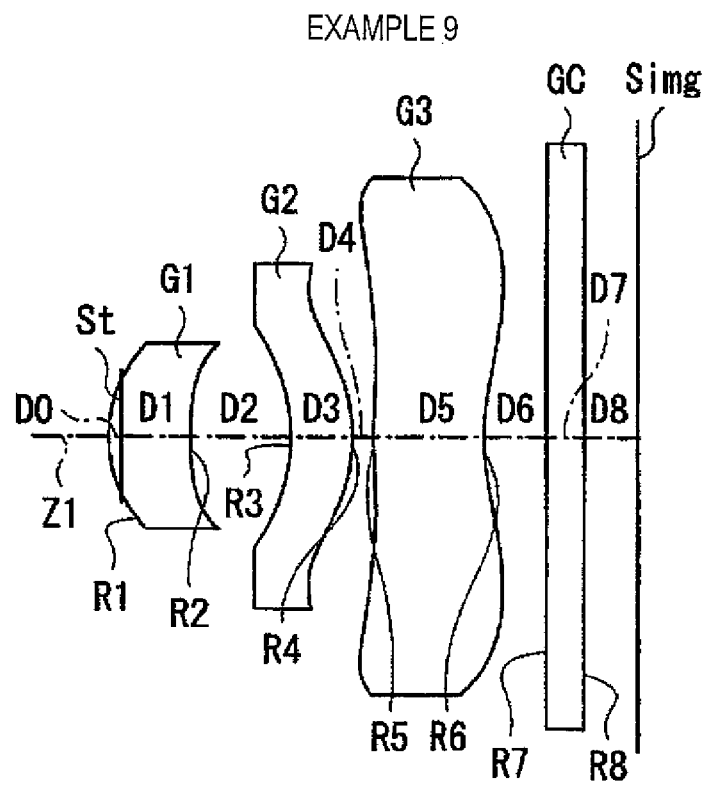
FIG. 9 is a section view showing the lens configuration of an imaging lens according to Example 9 of the invention.
Figure 10:
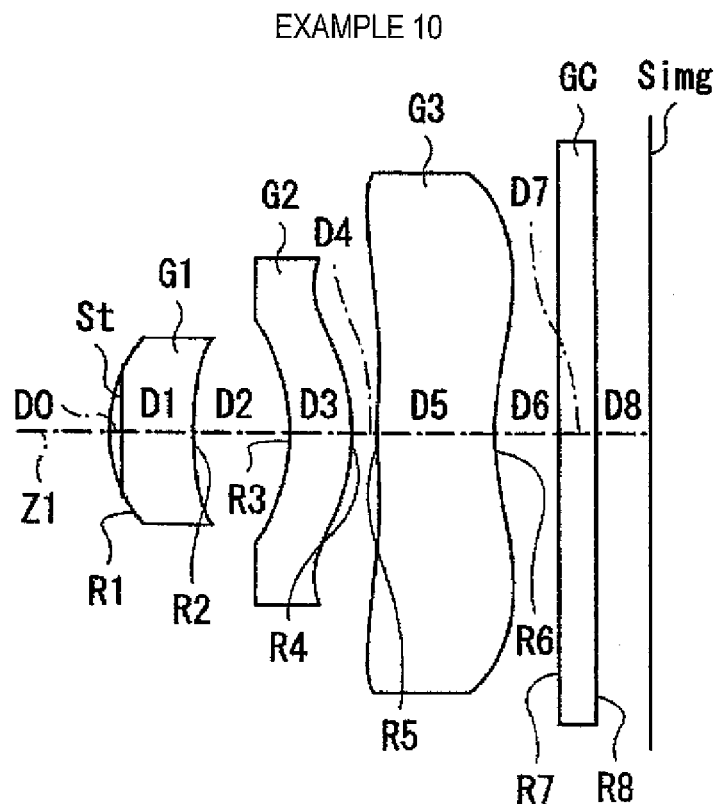
FIG. 10 is a section view showing the lens configuration of an imaging lens according to Example 10 of the invention.
Figure 11:
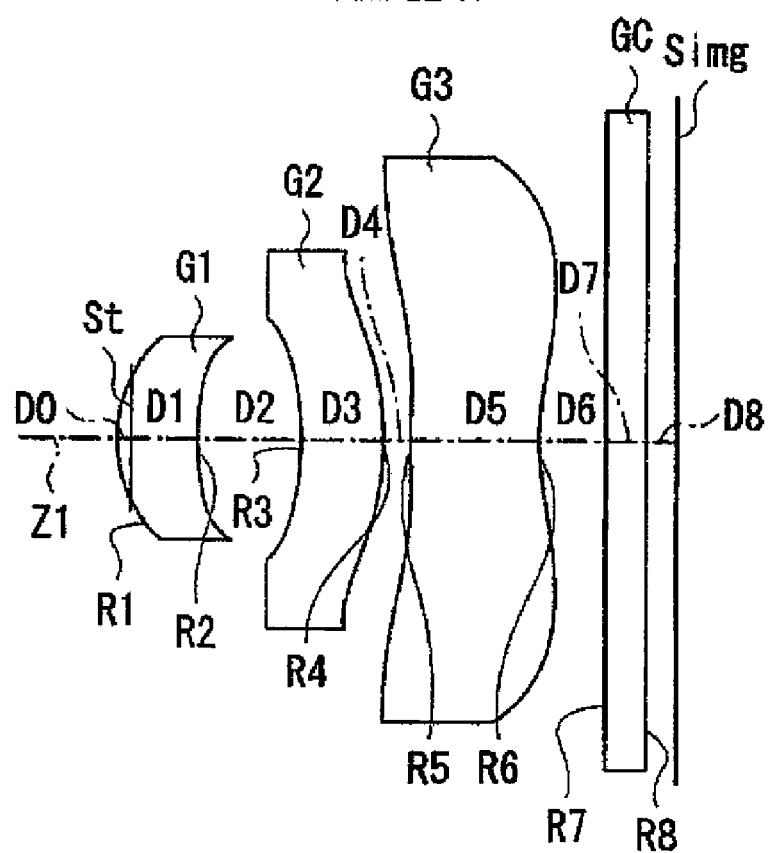
FIG. 11 is a section view showing the lens configuration of an imaging lens according to Example 11 of the invention.

FIG. 1 shows a first configuration example of an imaging lens according to one embodiment of the invention. This configuration example corresponds to a lens configuration according to a first numerical example (FIGS. 12 and 13) which will be described later. FIG. 2 shows a second configuration example corresponding to a lens configuration according to a second numerical example (FIGS. 14 and 15) which will be described later. FIG. 3 shows a third configuration example corresponding to a lens configuration according to a third numerical example (FIGS. 16 and 17) which will be described later. FIG. 4 shows a fourth configuration example corresponding to a lens configuration according to a fourth numerical example (FIGS. 18 and 19) which will be described later. FIG. 5 shows a fifth configuration example corresponding to a lens configuration according to a fifth numerical example (FIGS. 20 and 21) which will be described later. FIG. 6 shows a sixth configuration example corresponding to a lens configuration according to a sixth numerical example (FIGS. 22 and 23) which will be described later. FIG. 7 shows a seventh configuration example corresponding to a lens configuration according to a seventh numerical example (FIGS. 24 and 25) which will be described later. FIG. 8 shows an eighth configuration example corresponding to a lens configuration according to an eighth numerical example (FIGS. 26 and 27) which will be described later. FIG. 9 shows a ninth configuration example corresponding to a lens configuration according to a ninth numerical example (FIGS. 28 and 29) which will be described later. FIG. 10 shows a tenth configuration example corresponding to a lens configuration according to a tenth numerical example (FIGS. 30 and 31) which will be described later. FIG. 11 shows an eleventh configuration example corresponding to a lens configuration according to an eleventh numerical example (FIGS. 32 and 33) which will be described later. In FIGS. 1 to 11, the reference numeral Si denotes an i-th surface when an aperture stop St is counted as the zeroth surface and the surface number sequentially increases toward an image side (an image formation side). The reference numeral R1 denotes a radius of curvature of the surface Si. The reference numeral Di denotes a surface separation between the i-th surface Si and the (i+1)-th surface Si+1 on an optical axis Z1. The configuration examples have the same basic configuration. The configuration example of the imaging lens shown in FIG. 1 will be described below as a basic configuration. The configuration examples of FIGS. 2 to 11 will be also described, if necessary.

This imaging lens is suitable for use in various imaging apparatuses, such as a digital camera, a portable camera phone, and a portable information terminal, that uses an imaging device such as a CCD or a CMOS. The imaging lens has an aperture stop St, a first lens G1, a second lens G2 and a third lens G3 along the optical axis Z1 in order from the object side. An imaging device such as a CCD is disposed in an image formation surface Simg of the imaging lens. Between the third lens G3 and the imaging device, various optical elements, for example, a flat plate-like optical element such as a cover glass GC for protecting the image formation surface or an infrared cut filter may be disposed in accordance with the configuration of the camera mounted with the imaging lens. The imaging lens according to this embodiment is suitable for use in an imaging apparatus having an imaging device of, for example, 200 to 500 mega pixels.

The aperture stop St is an optical aperture stop and is disposed between the object-side surface of the first lens G1 and the image-side surface thereof. In the configuration example shown in FIG. 2, the aperture stop St is disposed at a vertex of the object-side surface of the first lens G1.

The first lens G1 has a positive refractive power and has a meniscus shape with a convex surface directed to the object side thereof. As a material of the first lens G1, a low-dispersion optical glass is preferably used because it can provide good aberration correction performance while its performance is less degraded due to temperature variation. The first lens G1 may be made of a resin material. This case is advantageous in cost and weight reduction.

The second lens G2 has a negative refractive power and has a concave object-side surface. The second lens G2 has at least one aspheric surface. Also, it is preferable that the object-side surface of the second lens G2 has an aspheric shape such that a negative refractive power becomes stronger from a vicinity of the optical axis toward a periphery of the object-side surface of the second lens G2. On the other hand, it is preferable that the image-side surface of the second lens G2 has an aspheric shape such that a positive refractive power becomes weaker from the vicinity of the optical axis toward a periphery of the image-side surface of the second lens G2. As show in the configuration examples of FIGS. 4 and 9, only the image-side surface of the second lens G2 may have an aspheric shape, and the object-side surface thereof may have a spherical shape. In this way, if only one surface is formed into an aspheric surface, it is possible to improve manufacturing efficiency, leading to cost reduction. As a material of the second lens G2, one that satisfies a conditional expression (6) described later is preferable. For example, a high refractive material such as a nanocomposite resin material, in which a refractive index is increased by introduction of nano particles, is suitable.

The third lens G3 has a negative refractive power and has at least one aspheric surface. In the configuration example shown in FIG. 1, the third lens G3 has a meniscus shape with a convex surface directed to the object side in the vicinity of the optical axis. The image-side surface of the third lens G3 is concave to the image side in the vicinity of the optical axis and is convex to the image side in the periphery of the optical axis. On the other hand, the object-side surface of the third lens G3 has an aspheric shape that is sequentially convex, concave and convex to the object side, from the vicinity of the optical axis to the periphery thereof.

The second and third lenses G2 and G3 each having a more complicated shape and a larger size than the first lens G1 may be made of a resin material. With this configuration, the complicated aspheric shapes can be easily formed with high precision and thus, the manufacturing efficiency is improved.

Further, the imaging lens is configured to satisfy the all the following conditional expressions (1) to (4). In the conditional expressions, f denotes the focal length of the entire system; f1 denotes the focal length of the first lens G1; f2 denotes the focal length of the second lens G2; SA denotes the amount of sag of the object-side surface of the second lens in a position where a principal ray passes the maximum angle of view (the maximum image height), the position being located at the maximum angle of view (the maximum image height) of the object-side surface of the second lens G2; Y denotes the maximum image height; and TL denotes a distance from the object-side surface of the first lens G1 to an image formation position. FIG. 46 shows the concepts of SA, Y and TL. As shown in FIG. 46, SA is defined as a distance, on the optical axis, between (i) a line that is perpendicular to the optical axis Z1 and is dropped from a point on the object-side surface S3 of the second lens G2 where a principal ray L1 passes and (ii) the object-side surface S3.

$$0.8 < f1/f < 1.2 \tag{1}$$

$$11 < |f2/f| \tag{2}$$

$$0.04 < SA/Y < 0.09 \tag{3}$$

$$TL/2Y < 0.9 \tag{4}$$

Alternatively, instead of the conditional expressions (3) and (4), the imaging lens may be configured to satisfy the following conditional expression (7):

$$f3/f < -1.6 \tag{7}$$

It is preferable that the imaging lens is configured to further satisfy the following conditional expression (5). In the conditional expression (5), R1 denotes the radius of curvature of the object-side surface of the first lens G1 in the vicinity of the optical axis, and R2 denotes the radius of curvature of the image-side surface of the first lens G1 in the vicinity of the optical axis.

$$0 < (|R2|-R1)/(|R2|+R1) < 0.5 \tag{5}$$

It is preferable that the imaging lens is configured to further satisfy the following conditional expression (6). In the conditional expression (6), $Nd_2$ denotes the refractive index of the second lens G2 at d-line (587.6 nm in wavelength).

$$1.68 < Nd_2 \tag{6}$$

Next, the operation and effect of the imaging lens having such configuration according to the embodiment will be described.

In the imaging lens, with the configuration having the small-number of lenses, that is, the three lenses in total, the shapes and refractive powers of the lens elements are appropriately set, and the conditional expressions (1) to (4) are satisfied. Thereby, the power distribution between the first and second lenses G1 and G2, and the shape of the object-side surface of the second lens G2 are optimized, and good aberration correction performance is achieved while reducing the length of the entire lens system. At this time, since the conditional expressions (2) and (3) are satisfied, the manufacturing sensitivity of the second lens G2 is lowered and it becomes easy to position the respective lenses. Accordingly, it becomes easy to assemble the lens system, thereby improving the manufacturing efficiency.

Since the aperture stop St is disposed on the optical axis and on the object side of the object-side surface of the second lens G2, the angle of an exiting light ray toward the image formation surface is decreased. Thus, it is possible to ensure telecentricity, that is, an incidence angle of a principal ray with respect to an imaging device is substantially parallel to the optical axis (i.e., an incidence angle on the image formation surface is about zero with respect to a normal line to the image formation surface). In addition, since the aperture stop St is disposed on the optical axis and at the vertex of the object-side surface of the first lens G1 or on the image side of the vertex of the object-side surface, it is advantageous in reduction of the length of the entire system as compared with the case in which the aperture stop St is disposed on the object side of the vertex of the object-side surface. It is requested to have telecentricity in order to cope with a high-performance imaging device. Therefore, by arranging the aperture stop St in the above way, it is advantageous in reducing the length of the entire lens system and achieving higher performance.

The object-side surface of the second lens G2 has such a shape that the negative refractive power thereof becomes stronger from the vicinity of the optical axis toward the periphery of the object-side surface of the second lens G2. Meanwhile, the image-side surface of the second lens G2 has such a shape that the positive refractive power becomes weaker from the vicinity of the optical axis toward the periphery of the image-side surface of the second lens G2. With this configuration, the surface shape of the second lens G2 is optimized. Thus, it is advantageous in reducing the length of the entire lens system and achieving higher performance. In particular, since the image-side surface of the second lens G2 has such a shape that the positive refractive power becomes weaker in the vicinity of the periphery of the optical axis, the peripheral aberration is appropriately corrected.

In the third lens G3, the light rays are better separated at each angle of view than the first and second lenses G1 and G2. For this reason, the image-side surface of the third lens G3, which is the closest lens surface to the imaging device, is made concave to the image side in the vicinity of the optical axis and convex to the image side in the periphery of the optical axis. With this configuration, the aberrations are appropriately corrected for each angle of view. As a result, incidence angles of light rays to the imaging device are controlled so as to be equal to or smaller than a predetermined angle. Accordingly, it becomes possible to suppress unevenness in light intensity over the entire areas of the image formation surface. Thus, the filed curvature, distortion and the like are advantageously corrected. Since the object-side surface of the third lens G3 has such a shape that is sequentially convex, concave and convex from the vicinity of the optical axis to the periphery of the object-side surface of the third lens G3, the peripheral aberration is more appropriately corrected.

In this way, by forming the lenses, especially, the image-side surface of the second lens G2 and the surfaces of the third lens G3, to have an appropriate aspheric shape, it becomes possible to maintain excellent aberration correction performance. Therefore, even if the object-side surface of the second lens G2 has a spherical shape or an aspheric shape that is relatively close to a spherical shape, it is possible to improve the manufacturing efficiency without deteriorating the aberration correction performance. The specific significance of the respective conditional expressions will be described below in detail.

Also, even if the imaging lens is configured to satisfy the conditional expression (7) instead of the conditional expressions (3) and (4), the power (refractive power) distribution among the respective lenses and the surface shapes of the respective lenses are optimized, thereby reducing the length of the entire lens system while securing manufacturing efficiency and thus correcting various aberrations. Also, the manufacturing sensitivity of the second lens G2 is lowered and the assembly sensitivity of the entire lens system is lowered, which improves manufacturing efficiency.

The conditional expression (1) relates to the focal length f1 of the first lens G1. If f1/f exceeds the upper limit of the conditional expression (1), it is difficult to correct the field curvature. If f1/f falls below the lower limit of the conditional expression (1), the exit pupil position becomes too short, and thus it is undesirable.

The conditional expression (2) relates to the focal length f2 of the second lens G2. If |f2/f| is out of the numeric range of the conditional expression (2), it is difficult to correct the aberration while maintaining the length of the entire lens system short, and thus it is undesirable. If the imaging lens is configured to satisfy the conditional expression (2), the refractive power of the second lens G2 is relatively weakened, thereby reducing the manufacturing sensitivity of the second lens G2. In the imaging lens according to this embodiment, since the second lens G2 has a relatively weak refractive power, the second lens G2 may have either a positive or negative refractive power.

The conditional expression (3) relates to a ratio of the maximum amount of sag in the position where the principal ray passes, the position being located at the maximum angle of view (the maximum image height) of the object-side surface of the second lens G2 to the maximum image height. If SA/Y falls below the lower limit of the conditional expression (3), it is difficult to correct aberration such as the field curvature. If SA/Y exceeds the upper limit of the conditional expression (3), the sensitivity of the second lens G2 rises, thereby deteriorating the manufacturing efficiency, and thus it is undesirable. If the imaging lens is configured to satisfy the conditional expression (3), it is possible to suppress the amount (depth) of sag of the object-side surface of the second lens G2 relatively small. Therefore, it is easy to process the surfaces while maintaining the manufacturing sensitivity of the second lens G2 low.

The conditional expression (4) relates to a ratio of the length of the entire lens system on the optical axis to the maximum image height. If TL/2Y exceeds the upper limit of the conditional expression (4), it is difficult to sufficiently reduce the length of the entire lens system, and thus it is undesirable.

The conditional expression (5) relates to the shape factor of the first lens G1. If (|R2|−R1)/(|R2|+R1) is out of the numeric range of the conditional expression (5), it is difficult to correct aberration such as spherical aberration and the field curvature, and thus it is undesirable. In the imaging lens according to this embodiment, in order to secure the manufacturing efficiency, the conditional expression (2) is satisfied so that the refractive power of the second lens G2 is relatively weakened, while the conditional expression (3) is satisfied so that the amount of sag of the object-side surface of the second lens G2 is suppressed to be relatively small. By satisfying the conditional expression (5), the manufacturing efficiency of the second lens G2 is secured, thereby appropriately supplementing insufficient correction of generated aberrations.

The conditional expression (6) relates to the refractive index of the second lens G2. If $Nd_2$ is out of the numeric range of the conditional expression (6), the aberration such as the filed curvature is insufficiently corrected, and thus is undesirable.

The conditional expression (7) relates to the focal length f3 of the third lens G3. By satisfying the conditional expression (2), the refractive power of the second lens G2 is weakened. However, if f3/f is out of the numerical range of the conditional expression (7), it is not preferable because a balance of aberrations becomes worse.

As described above, according to the imaging lens of this embodiment, with the configuration having the small-number of lenses, that is, the three lenses in total, the shapes, materials and refractive powers of the lens elements are optimized so as to satisfy the predetermined conditional expressions. With this configuration, it is possible to provide a lens system having excellent manufacturing efficiency, a compact configuration and excellent aberration correction performance.

Example

Next, specific numerical examples of the imaging lens according to this embodiment will be described. First to eleventh numerical examples (Examples 1 to 11) will be collectively described below.

FIGS. 12 and 13 show specific lens data corresponding to the configuration of the imaging lens shown in FIG. 1. Particularly, the basic lens data is shown in FIG. 12 and data relating to aspheric surfaces is shown in FIG. 13. The surface number Si in the lens data shown in FIG. 12 denotes the number of an i-th surface (where i=1 to 9) when the aperture stop St is counted as the zeroth surface and the surface number sequentially increases toward the image side. The curvature radius Ri denotes a curvature radius (mm) of the i-th surface from the object side so as to correspond to reference numeral Ri shown in FIG. 1. The surface separation Di denotes a separation (mm) between the i-th surface Si from the object side and the (i+1)-th surface Si+1 from the object side on the optical axis. It is noted that the examples in which the surface separation D0 of the aperture stop takes a negative value mean that the aperture stop St is located on the image side of the most-object-side lens surface (the object-side surface of the first lens G1). Reference numeral Ndi denotes a refractive index, at d-line (587.6 nm in wavelength), of the j-th optical element (j=1 to 4) from the object side. Reference numeral vdj denotes Abbe number, at d-line, of the j-th optical element from the object side. Paraxial focal lengths f (mm) of the whole system and F numbers (FNO.) are also shown as various data in FIG. 12.

In the imaging lens according to Example 1, both surfaces of each of the first lens G1, second lens G2 and third lens G3 are aspheric. In the basic lens data of FIG. 12, values of curvature radii in the vicinity of the optical axis are shown as curvature radii of these aspheric surfaces. In the column of the surface number Si, sign "*" attached to the left of the surface number means that a corresponding lens surface is aspheric. In the numerical values shown as the aspheric data in FIG. 13, sign "E" denotes that a numerical value subsequent thereto is an "exponent" having 10 as its base and represents that a numerical value expressed by an exponential function having 10 as its base is multiplied by a numerical value in front of "E." For example, "1.0E-02" represents "$1.0 \times 10^{-2}$."

Values of coefficients $A_n$ and K in an aspheric expression expressed by the following expression A are shown as the aspheric data. More specifically, Z denotes a length (mm) of a perpendicular line connecting a point on the aspheric surface located at a height h from the optical axis to a tangential plane (plane perpendicular to the optical axis) of a vertex of the aspheric surface. In the imaging lens according to Example 1, coefficients of $A_3$ to $A_{10}$ are properly and effectively used as the aspheric coefficient $A_n$.

$$Z = C \cdot h^2 / \{1 + (1 - K \cdot C^2 \cdot h^2)^{1/2}\} + \Sigma A_n \cdot h^n \quad (A)$$

where n denotes an integer equal to or greater than 3,

Z denotes a depth (mm) of the aspheric surface, h denotes a distance (height) (mm) from the optical axis to the lens surface, K denotes an eccentricity, C denotes a paraxial curvature=1/R (where R is a paraxial curvature radius), and $A_n$ denotes an n-th order aspheric coefficient (n=3 to 10).

Similar to the imaging lens according to Example 1, FIGS. 14 and 15 show specific lens data of Example 2 corresponding to the configuration of the imaging lens shown in FIG. 2. Similarly, FIGS. 16 and 17 show specific lens data of Example 3 corresponding to the configuration of the imaging lens shown in FIG. 3. Similarly, FIGS. 18 and 19 show specific lens data of Example 4 corresponding to the configuration of the imaging lens shown in FIG. 4. Similarly, FIGS. 20 and 21 show specific lens data of Example 5 corresponding to the configuration of the imaging lens shown in FIG. 5. Similarly, FIGS. 22 and 23 show specific lens data of Example 6 corresponding to the configuration of the imaging lens shown in FIG. 6. Similarly, FIGS. 24 and 25 show specific lens data of Example 7 corresponding to the configuration of the imaging lens shown in FIG. 7. Similarly, FIGS. 26 and 27 show specific lens data of Example 8 corresponding to the configuration of the imaging lens shown in FIG. 8. Similarly, FIGS. 28 and 29 show specific lens data of Example 9 corresponding to the configuration of the imaging lens shown in FIG. 9. Similarly, FIGS. 30 and 31 show specific lens data of Example 10 corresponding to the configuration of the imaging lens shown in FIG. 10. Similarly, FIGS. 32 and 33 show specific lens data of Example 11 corresponding to the configuration of the imaging lens shown in FIG. 11. In Examples 4 and 9, the object-side surface of the second lens G2 has a spherical shape.

FIG. 34 shows values, in the respective Examples, corresponding to the above-described conditional expressions (1) to (7). As shown in FIG. 34, all the values in Examples fall within the numeric ranges of the respective conditional expressions. Regarding the conditional expression (6), the values of the imaging lenses of only Examples 10 and 11 fall within its numeric range.

Figure 35A:
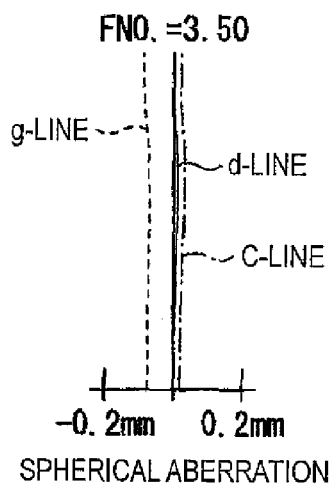
Figure 35B:
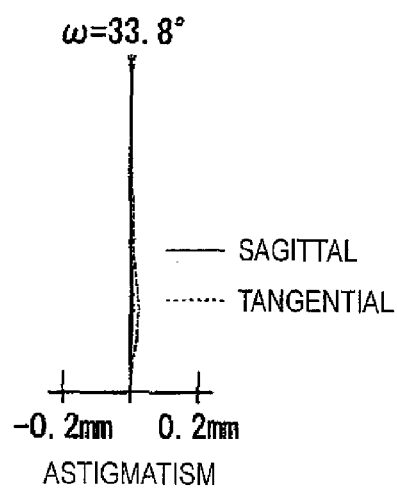
Figure 35C:
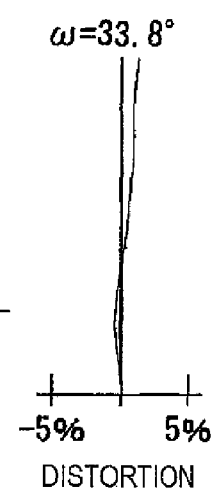

FIGS. 35A to 35C show spherical aberration, astigmatism and distortion (distortional aberration) in the imaging lens of Example 1, respectively. Each aberration diagram shows aberration with using d-line as a reference wavelength. The spherical aberration diagram also shows aberrations at g-line (435.8 nm in wavelength) and c-line (656.3 nm in wavelength). In the astigmatism diagram, the solid line shows aberration in a sagittal direction, and the broken line shows aberration in a tangential direction. In the aberration diagrams, "FNO." denotes an F value, and ω denotes a half of an angle of view.

Figure 36A:
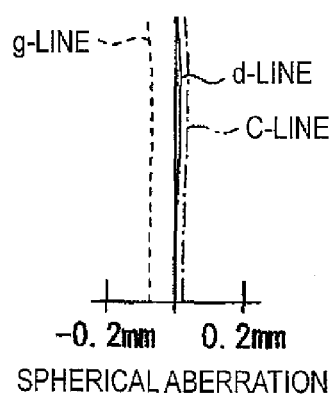
Figure 36B:
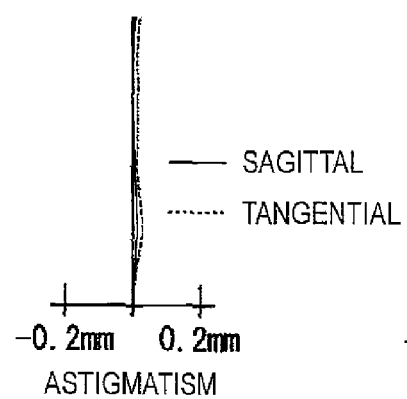
Figure 36C:
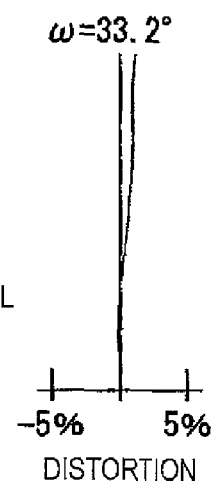
Figure 37A:
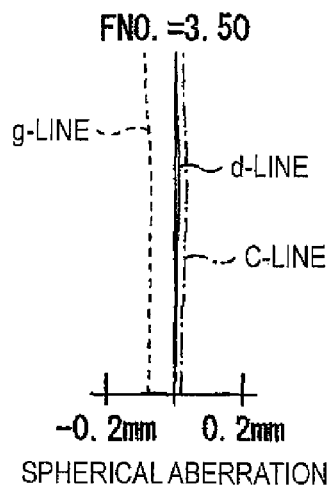
Figure 37B:
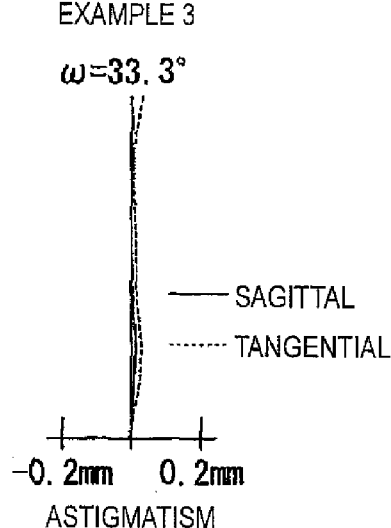
Figure 37C:
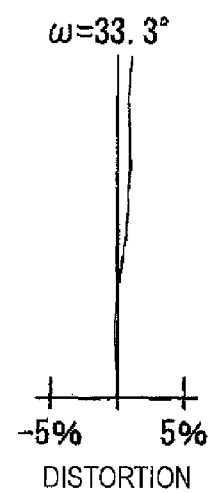
Figure 38A:
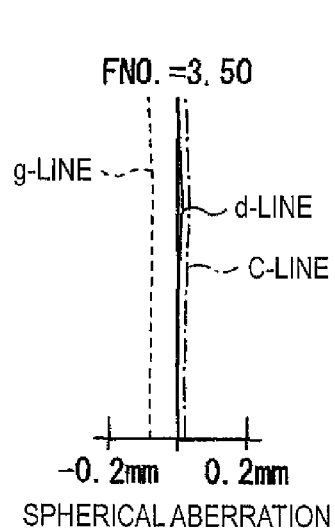
Figure 38B:
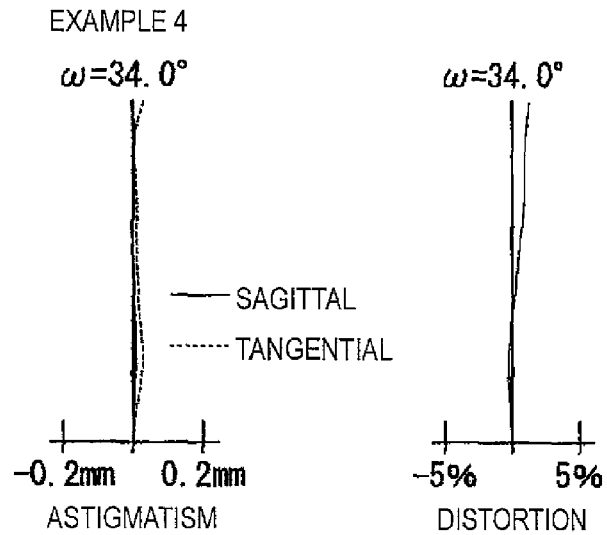
Figure 38C:
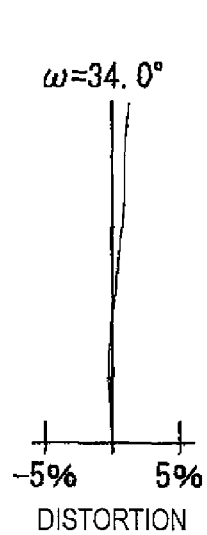
Figure 39A:
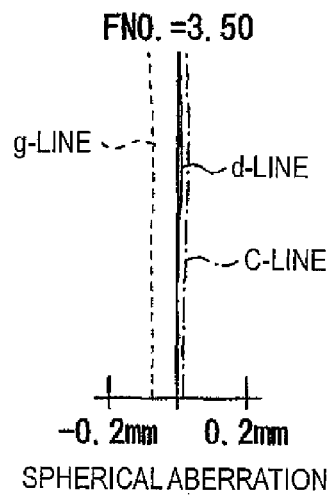
Figure 39B:
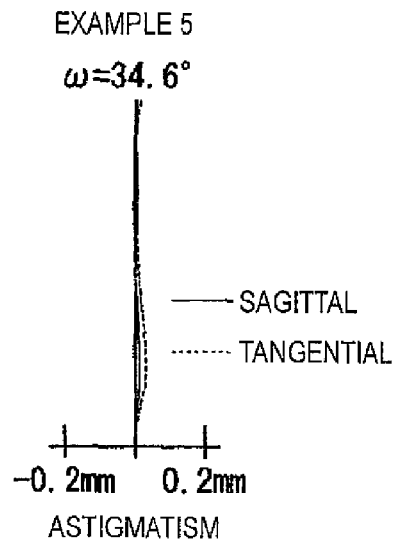
Figure 39C:
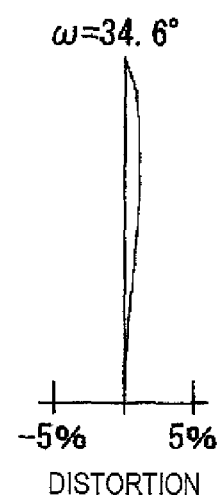
Figure 40A:
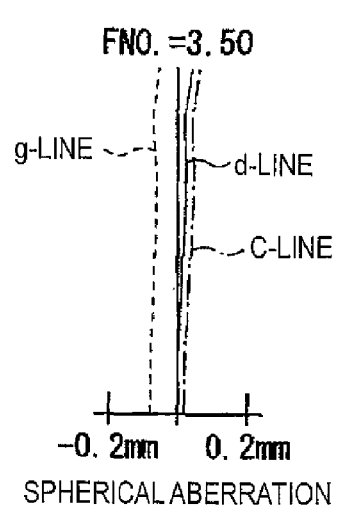
Figure 40B:
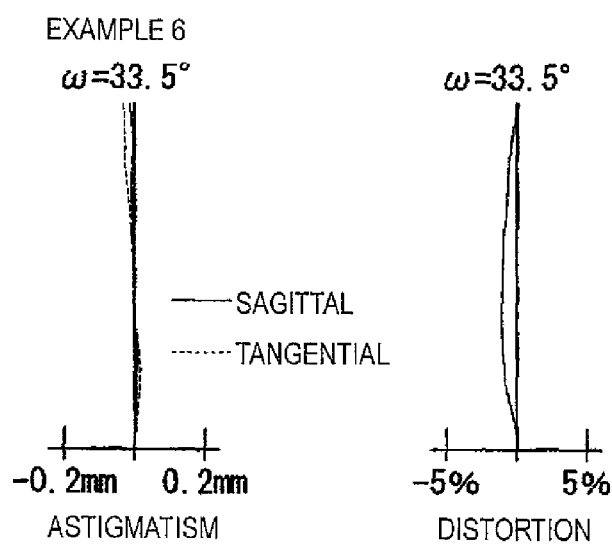
Figure 40C:
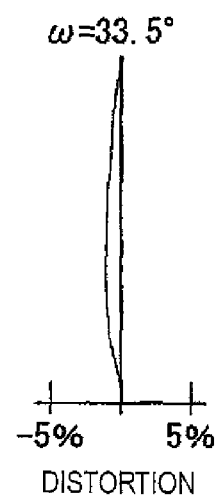

Similarly, FIGS. 36A to 36C show various aberrations in Example 2. Similarly, FIGS. 37A to 37C show various aberrations in Example 3. Similarly, FIGS. 38A to 38C show various aberrations in Example 4. Similarly, FIGS. 39A to 39C show various aberrations in Example 5. Similarly, FIGS. 40A to 40C show various aberrations in Example 6. Similarly, FIGS. 41A to 41C show various aberrations in Example 7. Similarly, FIGS. 42A to 42C show various aberrations in Example 8. Similarly, FIGS. 43A to 43C show various aberrations in Example 9. Similarly, FIGS. 44A to 44C show various aberrations in Example 10. Similarly, FIGS. 45A to 45C show various aberrations in Example 11.

As is apparent from the aforementioned lens data and the aforementioned aberration diagrams, with three lenses in total, the respective Examples provide an imaging lens system having excellent manufacturing efficiency, a compact configuration and higher performance, in which the shapes, materials and refractive powers of the lens elements are optimized.

The invention has been described above with reference to several embodiments and examples. The invention is not limited to the embodiments and examples, but various modifications can be made. For example, the values of the radius of curvature, the surface separation and the refractive index of each lens are not limited to the values shown in the corresponding numerical example, but other values may be used.

What is claimed is:

1. An imaging lens comprising, in order from an object side:
   a first lens having a positive refractive power and having a meniscus shape with a convex surface directed to the object side thereof;
   a second lens having a concave object-side surface; and
   a third lens that has a negative refractive power in a vicinity of an optical axis, wherein
   each of the second and third lenses has at least one aspheric surface, and
   the following conditional expressions are satisfied:

$$0.8 < f1/f < 1.2 \tag{1}$$

$$11 < |f2/f| \tag{2}$$

$$0.04 < SA/Y < 0.09 \tag{3}$$

$$TL/2Y < 0.9 \tag{4}$$

where
   f denotes a focal length of the entire system,
   f1 denotes a focal length of the first lens,
   f2 denotes a focal length of the second lens,
   SA denotes the amount of sag of the object-side surface of the second lens in a position where a principal ray passes the maximum image height,
   Y denotes the maximum image height, and
   TL denotes a distance from an object-side surface of the first lens to an image formation position.

2. The imaging lens according to claim 1, wherein the following conditional expressions are satisfied:

$$0 < (|R2|-R1)/(|R2|+R1) < 0.5 \tag{5}$$

where
   R1 denotes a radius of curvature of the object-side surface of the first lens in the vicinity of the optical axis, and
   R2 denotes a radius of curvature of an image-side surface of the first lens in the vicinity of the optical axis.

3. The imaging lens according to claim 1, wherein
   the object-side surface of the second lens has an aspheric shape such that a negative refractive power thereof becomes stronger from the vicinity of the optical axis toward a periphery of the object-side surface of the second lens, and
   the image-side surface of the second lens has an aspheric shape such that a positive refractive power thereof becomes weaker from the vicinity of the optical axis toward a periphery of the image-side surface of the second lens.

4. The imaging lens according to claim 2, wherein
   the object-side surface of the second lens has an aspheric shape such that a negative refractive power thereof becomes stronger from the vicinity of the optical axis toward a periphery of the object-side surface of the second lens, and
   the image-side surface of the second lens has an aspheric shape such that a positive refractive power thereof becomes weaker from the vicinity of the optical axis toward a periphery of the image-side surface of the second lens.

5. The imaging lens according to claim 1, wherein the object-side surface of the second lens has a spherical shape.

6. The imaging lens according to claim 2, wherein the object-side surface of the second lens has a spherical shape.

7. The imaging lens according to claim 1, wherein the following conditional expressions are satisfied:

$$1.68 < Nd2 \tag{6}$$

where
   $Nd_2$ denotes a refractive index of the second lens at d-line of 587.6 nm in wavelength.

8. The imaging lens according to claim 2, wherein the following conditional expressions are satisfied:

$$1.68 < Nd_2 \tag{6}$$

where
   $Nd_2$ denotes a refractive index of the second lens at d-line of 587.6 nm in wavelength.

9. The imaging lens according to claim 3, wherein the following conditional expressions are satisfied:

$$1.68 < Nd_2 \tag{6}$$

where
   $Nd_2$ denotes a refractive index of the second lens at d-line of 587.6 nm in wavelength.

10. The imaging lens according to claim 4, wherein the following conditional expressions are satisfied:

$$1.68 < Nd_2 \tag{6}$$

where
    $Nd_2$ denotes a refractive index of the second lens at d-line of 587.6 nm in wavelength.

11. The imaging lens according to claim 5, wherein the following conditional expressions are satisfied:

$$1.68 < Nd_2 \tag{6}$$

where
    $Nd_2$ denotes a refractive index of the second lens at d-line of 587.6 nm in wavelength.

12. The imaging lens according to claim 6, wherein the following conditional expressions are satisfied:

$$1.68 < Nd_2 \tag{6}$$

where
    $Nd_2$ denotes a refractive index of the second lens at d-line of 587.6 nm in wavelength.

13. An imaging lens comprising, in order from an object side:
    a first lens having a positive refractive power and having a meniscus shape with a convex surface directed to the object side thereof;
    a second lens having a concave object-side surface; and
    a third lens that has a negative refractive power in a vicinity of an optical axis, wherein
    each of the second and third lenses has at least one aspheric surface, and
    the following conditional expressions are satisfied:

$$0.8 < f1/f < 1.2 \tag{1}$$

$$11 < |f2/f| \tag{2}$$

$$f3/f < -1.6 \tag{7}$$

$$0 < (|R2|-R1)/(|R2|+R1) \leq 0.39 \tag{5'}$$

where
    f denotes a focal length of the entire system,
    f1 denotes a focal length of the first lens,
    f2 denotes a focal length of the second lens, and
    f3 denotes a focal length of the third lens, R1 denotes a radius of curvature of the object-side surface of the first lens in the vicinity of the optical axis, and R2 denotes a radius of curvature of an image-side surface of the first lens in the vicinity of the optical axis.

14. The imaging lens according to claim 13, wherein the object-side surface of the second lens has an aspheric shape such that a negative refractive power thereof becomes stronger from the vicinity of the optical axis toward a periphery of the object-side surface of the second lens, and the image-side surface of the second lens has an aspheric shape such that a positive refractive power thereof becomes weaker from the vicinity of the optical axis toward a periphery of the image-side surface of the second lens.

15. The imaging lens according to claim 13, wherein the object-side surface of the second lens has a spherical shape.

16. The imaging lens according to claim 13, wherein the following conditional expressions are satisfied:

$$1.68 < Nd_2 \quad (6)$$

where $Nd_2$ denotes a refractive index of the second lens at d-line of 587.6 nm in wavelength.

17. An imaging apparatus comprising:

the imaging lens according to claim 1; and an imaging device that outputs an imaging signal in accordance with an optical image formed by the imaging lens.

18. An imaging apparatus comprising:

the imaging lens according to claim 13; and an imaging device that outputs an imaging signal in accordance with an optical image formed by the imaging lens.

19. An imaging lens comprising, in order from an object side:

a first lens having a positive refractive power and having a meniscus shape with a convex surface directed to the object side thereof;

a second lens having a concave object-side surface; and a third lens that has a negative refractive power in a vicinity of an optical axis, wherein each of the second and third lenses has at least one aspheric surface, and the following conditional expressions are satisfied:

$$0.8 < f1/f < 1.2 \quad (1)$$

$$11 < |f2/f| \quad (2)$$

$$1.68 < Nd_2 \quad (6)$$

$$f3/f < -1.6 \quad (7)$$

where f denotes a focal length of the entire system, f1 denotes a focal length of the first lens, f2 denotes a focal length of the second lens, f3 denotes a focal length of the third lens, and $Nd_2$ denotes a refractive index of the second lens at d-line of 587.6 nm in wavelength.

20. The imaging lens according to claim 19, wherein the following conditional expressions are satisfied:

$$0 < (|R2| - R1)/(|R2| + R1) < 0.5 \quad (5)$$

where

R1 denotes a radius of curvature of the object-side surface of the first lens in the vicinity of the optical axis, and R2 denotes a radius of curvature of an image-side surface of the first lens in the vicinity of the optical axis.

21. The imaging lens according to claim 19, wherein the object-side surface of the second lens has an aspheric shape such that a negative refractive power thereof becomes stronger from the vicinity of the optical axis toward a periphery of the object-side surface of the second lens, and the image-side surface of the second lens has an aspheric shape such that a positive refractive power thereof becomes weaker from the vicinity of the optical axis toward a periphery of the image-side surface of the second lens.

* * * * *